US011858502B2

(12) United States Patent
Shimizu

(10) Patent No.: US 11,858,502 B2
(45) Date of Patent: Jan. 2, 2024

(54) VEHICLE CONTROL DEVICE

(71) Applicant: Hitachi Astemo, Ltd., Hitachinaka (JP)

(72) Inventor: Ryosuke Shimizu, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 117 days.

(21) Appl. No.: 17/609,581

(22) PCT Filed: Jun. 5, 2020

(86) PCT No.: PCT/JP2020/022263
§ 371 (c)(1),
(2) Date: Nov. 8, 2021

(87) PCT Pub. No.: WO2020/255748
PCT Pub. Date: Dec. 24, 2020

(65) Prior Publication Data
US 2022/0219684 A1  Jul. 14, 2022

(30) Foreign Application Priority Data

Jun. 21, 2019  (JP) ................. 2019-115078

(51) Int. Cl.
B60W 30/09  (2012.01)
B60T 7/22  (2006.01)
B60W 40/13  (2012.01)

(52) U.S. Cl.
CPC ............... B60W 30/09 (2013.01); B60T 7/22 (2013.01); B60W 40/13 (2013.01);
(Continued)

(58) Field of Classification Search
CPC ...... B60W 30/02; B60W 30/09; B60W 40/02; B60W 40/114; B60W 40/12; B60W 40/13;
(Continued)

(56) References Cited

U.S. PATENT DOCUMENTS 11,726,174 B1 *  8/2023  Campbell ............. G01S 7/4008
                                                      342/70
2007/0067085 A1 *  3/2007  Lu .......................... B60T 8/24
                                                      340/440
(Continued)

FOREIGN PATENT DOCUMENTS

EP    2763121 A1 *  8/2014  .......... B60W 10/184
JP    2004-224262 A    8/2004
(Continued)

OTHER PUBLICATIONS

International Search Report with English translation and Written Opinion issued in corresponding application No. PCT/JP2020/022263 dated Sep. 24, 2020.

*Primary Examiner* — Atul Trivedi
(74) *Attorney, Agent, or Firm* — Foley & Lardner LLP

(57) ABSTRACT

The present invention provides a vehicle control device capable of enhancing the ability of reducing or avoiding collision damage in a vehicle where a behavior of the vehicle when a braking operation is performed is largely influenced corresponding to a state of load (a loaded state), for example. The vehicle control device includes: a travelability determination unit 300 configured to determine whether or not a vehicle 1 is travelable in an area disposed ahead of the vehicle on left and right sides of the vehicle; a deflection estimation unit 200 configured to estimate deflection of the vehicle 1 due to generation of a brake force applied to the vehicle 1; and a braking control unit 800 configured to calculate deceleration and deceleration start timing based on a distance between the vehicle 1 and an obstacle ahead of the vehicle 1 and a relative speed of the vehicle 1 to the obstacle, and configured to change at least one of the deceleration and the deceleration start timing based on a travelability determination result acquired from the travelability determination (Continued)

unit 300 and a deflection estimation result acquired from the deflection estimation unit 200.

11 Claims, 18 Drawing Sheets

(52) U.S. Cl.
CPC . *B60W 2040/1307* (2013.01); *B60W 2520/14* (2013.01); *B60W 2530/10* (2013.01); *B60W 2552/30* (2020.02); *B60W 2554/4041* (2020.02); *B60W 2554/802* (2020.02); *B60W 2554/804* (2020.02); *B60W 2710/18* (2013.01); *B60W 2720/106* (2013.01)

(58) Field of Classification Search
CPC ..... B60W 2040/1307; B60W 2520/14; B60W 2530/10; B60W 2552/30; B60W 2554/4041; B60W 2710/18; B60W 2720/106; B60T 7/22; B60T 2201/022; B60T 2201/024; B60T 8/1755; G08G 1/166
USPC .......................................................... 701/96
See application file for complete search history.

(56) References Cited

U.S. PATENT DOCUMENTS

| | | | | |
|---|---|---|---|---|
| 2012/0221209 | A1* | 8/2012 | Tatsukawa | B60W 10/184 701/42 |
| 2012/0323474 | A1* | 12/2012 | Breed | G08G 1/161 701/117 |
| 2014/0236428 | A1* | 8/2014 | Akiyama | G08G 1/165 701/42 |
| 2015/0039199 | A1* | 2/2015 | Kikuchi | B60G 17/0164 701/70 |
| 2015/0046034 | A1* | 2/2015 | Kikuchi | B60G 17/018 701/37 |
| 2017/0158199 | A1* | 6/2017 | Pallett | B60W 30/18163 |
| 2017/0160745 | A1* | 6/2017 | Lauffer | B60W 30/18 |
| 2017/0259817 | A1* | 9/2017 | Horiguchi | B60W 30/18154 |
| 2017/0369054 | A1* | 12/2017 | Nishimura | B60W 30/095 |
| 2018/0037112 | A1* | 2/2018 | Otake | F16D 65/186 |
| 2018/0154892 | A1* | 6/2018 | Tamura | G06V 20/56 |
| 2018/0345969 | A1* | 12/2018 | Yasui | B60W 50/04 |
| 2019/0061745 | A1* | 2/2019 | Hatano | B60W 60/0053 |
| 2019/0126711 | A1* | 5/2019 | Giovanardi | B60G 17/0161 |
| 2020/0282983 | A1 | 9/2020 | Ito et al. | |
| 2021/0053564 | A1* | 2/2021 | Imamura | B60T 8/1755 |
| 2021/0316733 | A1* | 10/2021 | Mizoguchi | B60W 30/146 |
| 2022/0009509 | A1* | 1/2022 | Sakashita | B60W 30/18172 |
| 2022/0258742 | A1* | 8/2022 | Okada | G06V 20/588 |
| 2022/0324421 | A1* | 10/2022 | Giovanardi | B60W 10/18 |
| 2023/0147535 | A1* | 5/2023 | Terazawa | G06V 20/588 701/1 |
| 2023/0202473 | A1* | 6/2023 | Shalev-Shwartz | G08G 1/04 701/93 |
| 2023/0204386 | A1* | 6/2023 | Kitahara | G01C 21/32 701/450 |

FOREIGN PATENT DOCUMENTS

| | | |
|---|---|---|
| JP | 2008-037259 A | 2/2008 |
| JP | 2009-262698 A | 11/2009 |
| JP | 2016-137851 A | 8/2016 |
| JP | 2019-093934 A | 6/2019 |
| WO | WO-2020203055 A1 * | 10/2020 ................ B60T 7/22 |

\* cited by examiner

FIG.5
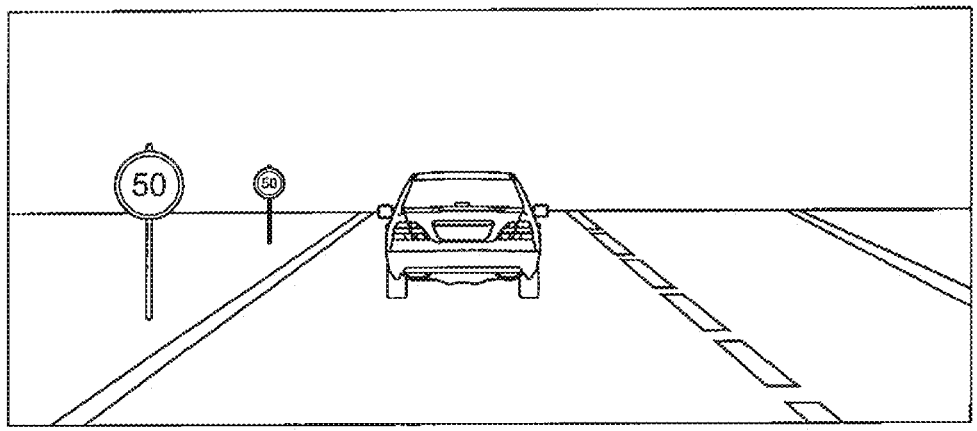
PCT1
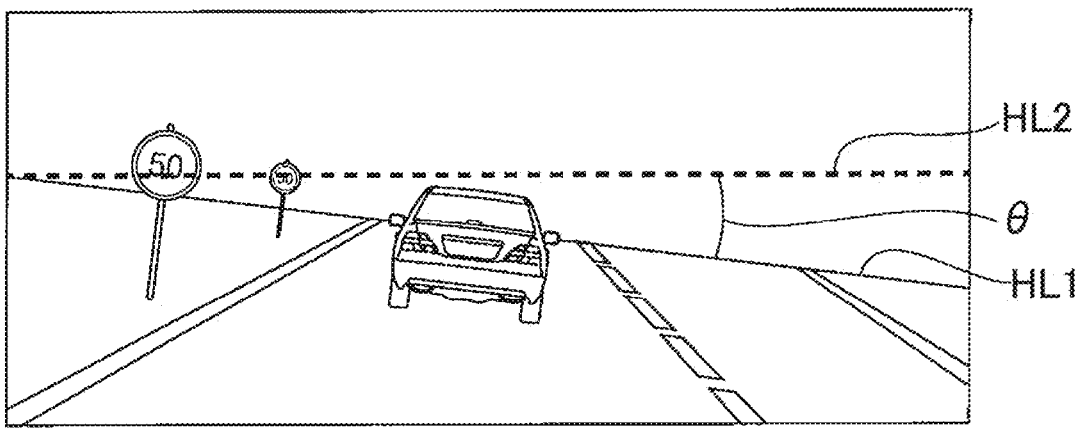
PCT2

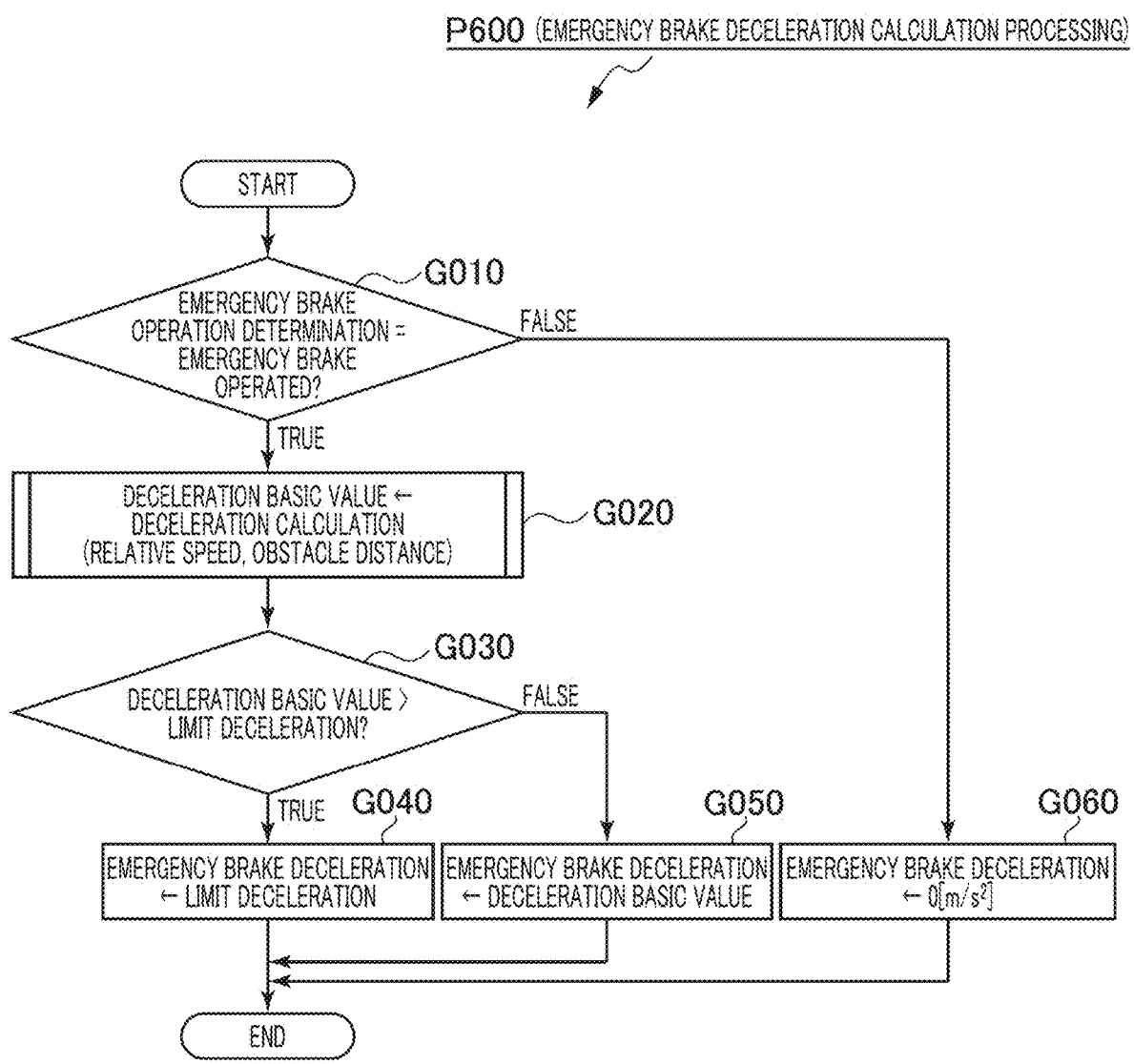

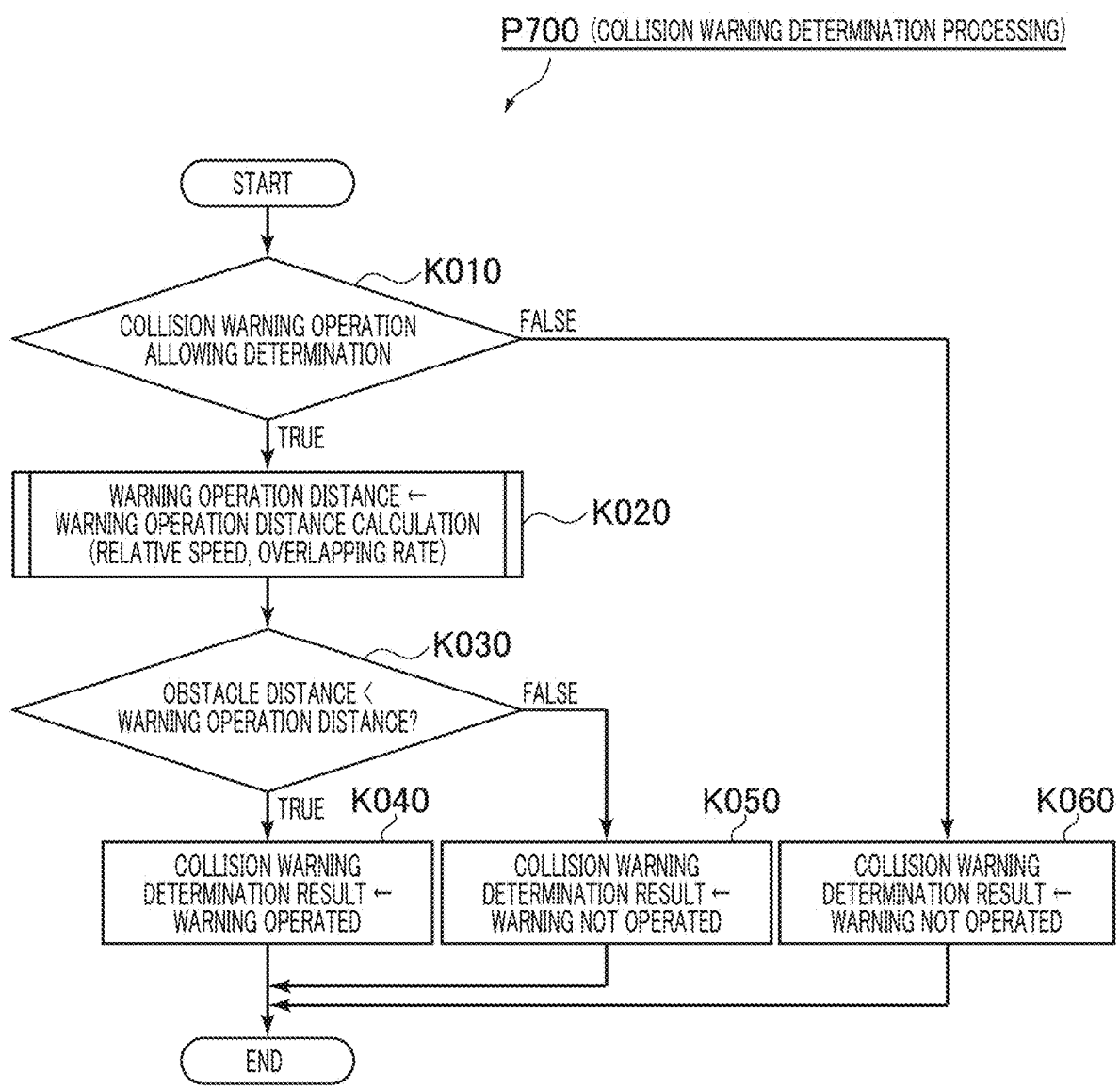

VEHICLE CONTROL DEVICE

TECHNICAL FIELD

The present invention relates to a vehicle control device, and more particularly to a vehicle control device which performs a deceleration control of a vehicle based on external field recognition information of a vehicle for suppressing (avoiding or reducing) collision damage with an obstacle ahead of the vehicle.

BACKGROUND ART

Recently, a technique which avoids or reduces collision damage has been in progress along with a progress of an automatic vehicle control and lowering of a cost of sensors. In such a technique, an obstacle is detected using a radar or a camera, and braking is automatically applied to wheels when there exists a possibility of collision with the detected obstacle. For example, patent literature 1 discloses a vehicle control device mounted on an automobile which avoids or reduces collision damage. In such a vehicle control device, a distance between an obstacle ahead of an own vehicle and the own vehicle and a relative speed of the own vehicle are calculated based on an image imaged by a stereoscopic camera, and an automatic brake is operated when the distance is so small that it is difficult for a driver to avoid the collision damage.

The application of the above-mentioned vehicle control device used in the automobile to a truck, a bus or the like has been studied. However, for example, a vehicle behavior of a truck during a braking operation is largely influenced by a state of load compared to an automobile. Accordingly, there has already been known a technique where a control characteristic of a brake is changed corresponding to a state of a load thus maintaining a posture of the vehicle at the time of operating an automatic brake so that safety of a vehicle is enhanced (for example, see patent literature 2).

CITATION LIST

Patent Literature

[Patent literature 1] Japanese Unexamined Patent Application Publication No. 2009-262698
[Patent literature 2] Japanese Unexamined Patent Application Publication No. 2004-224262

SUMMARY OF INVENTION

Technical Problem

However, in the prior art described in the above-mentioned patent literature 2, when the center of gravity of the vehicle is high or when the distribution of weights to respective wheels of the vehicle is not uniform, a deceleration coefficient is made gentle, that is, braking is made weak so that a posture of the vehicle is maintained. Accordingly, a deceleration amount for an obstacle is lowered thus giving rise to a drawback that the reduction of collision damage becomes insufficient.

Particularly, in a case where the center of gravity of the vehicle is offset to either a left side or a right side by loading a load on an own vehicle in an offset manner to a left side or to a right side (such a state also being referred to as offset loading), when braking is applied to left and right wheels of the vehicle with an equal pressure, the advancing direction of the vehicle is bent in the direction that the center of gravity is offset (such a change in the advancing direction being also referred to as "deflection"). Accordingly, the vehicle advances toward an opposite lane or a sidewalk thus giving rise to a drawback that a collision accident is induced. To prevent such a drawback, there is a case where a deceleration force generated by collision damage alleviation brake is limited. However, in this case, the reduction of collision damage becomes insufficient as described above and hence, there is a room for the enhancement of collision damage reduction ability.

The present invention has been made in view of the above-mentioned circumstances, and it is an object of the present invention to provide a vehicle control device which can enhance a performance of reducing and avoiding collision damage in a vehicle where a vehicle behavior during a braking operation is largely influenced by a state of load (a loaded state), for example.

Solution to Problem

A vehicle control device according to the present invention provided for overcoming the above-mentioned drawbacks is a vehicle control device configured to perform a deceleration control of a vehicle for reducing or an avoiding collision damage between a vehicle and an obstacle ahead of the vehicle, the vehicle control device including: a travelability determination unit configured to determine whether or not the vehicle is travelable in an area disposed ahead of the vehicle on left and right sides of the vehicle; a deflection estimation unit configured to estimate deflection of the vehicle due to generation of a brake force applied to the vehicle; and a braking control unit configured to calculate deceleration and deceleration start timing based on a distance between the vehicle and an obstacle ahead of the vehicle and a relative speed of the vehicle to the obstacle, and configured to change at least one of the deceleration and the deceleration start timing based on a travelability determination result acquired from the travelability determination unit and a deflection estimation result acquired from the deflection estimation unit.

Advantageous Effects of Invention

According to the present invention, even in a scene where an advancing direction of an own car is changed due to an operation of an automatic brake applied to a vehicle, in a case where an object which induces collision damage does not exist, it is possible to enhance performances of reducing and avoiding collision damage using a strong brake.

The objects, the configurations and the advantageous effects other than the above described will become apparent from an embodiment described hereinafter.

BRIEF DESCRIPTION OF DRAWINGS

FIG. 5 is a view showing images imaged by a stereoscopic camera showing examples of the estimation of a roll angle of an own vehicle.

FIG. 17 is a flowchart showing emergency brake deceleration calculation processing.

FIG. 18 is a flowchart showing collision warning determination processing.

DESCRIPTION OF EMBODIMENT

Hereinafter, a vehicle control device according to an embodiment of the present invention is described with reference to drawings.

Figure 1:
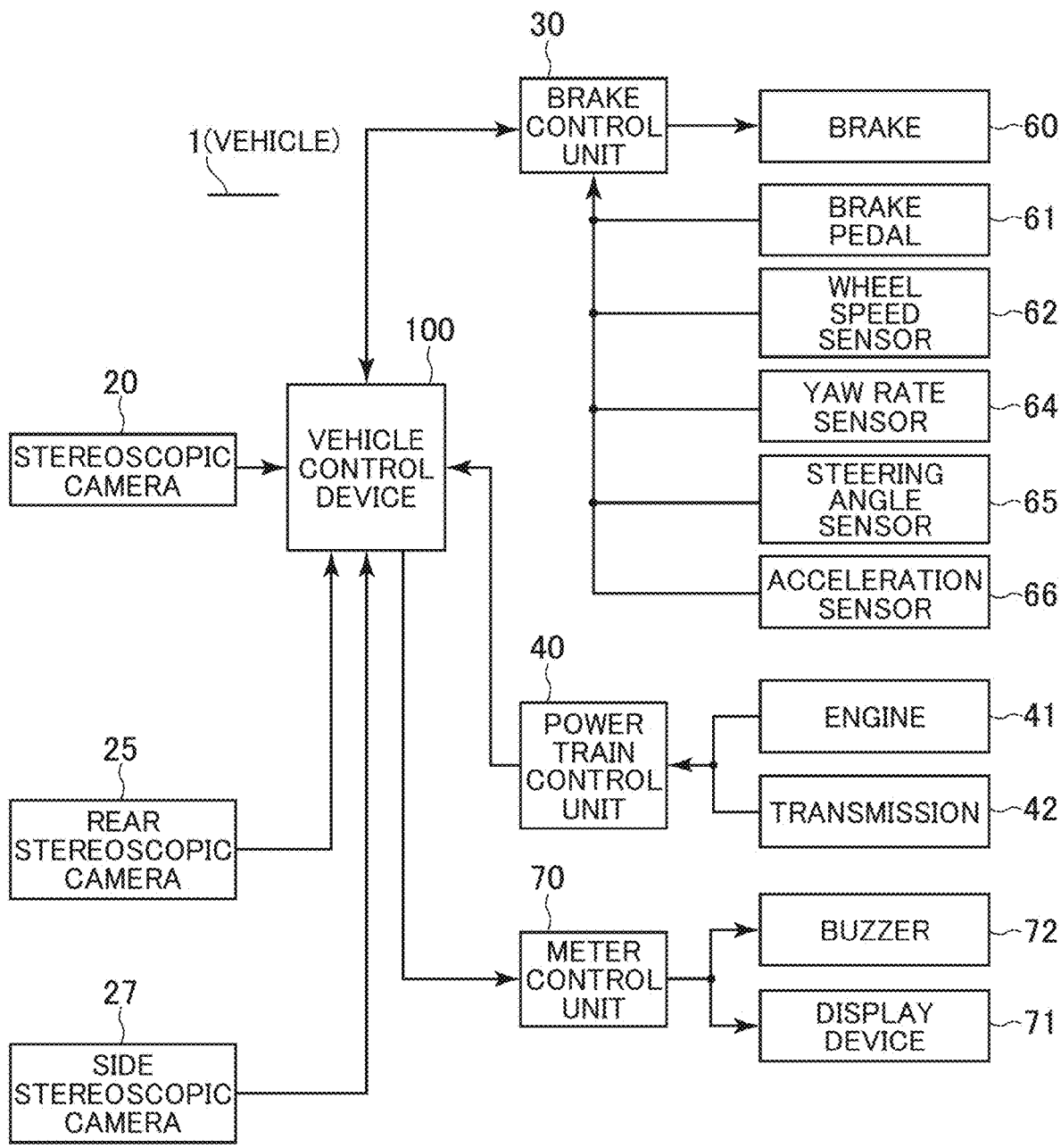
FIG. 1 is a block diagram showing the system configuration of a vehicle which includes a vehicle control device according to this embodiment.

FIG. 1 is a block diagram showing the system configuration of a vehicle which includes a vehicle control device according to this embodiment. A vehicle control device 100 is a brake control device for reducing collision damage to a vehicle according to the embodiment. The vehicle control device 100 is mounted on a vehicle 1 (also referred to as an own automobile or an own vehicle hereinafter), and performs a traveling control in which a deceleration control of the vehicle 1 is included.

To the vehicle control device 100, a stereoscopic camera 20 which forms a vehicle external field recognition sensor, a brake control unit 30, a power train control unit 40, a meter control unit 70 and the like are connected via communication (for example, car area network (CAN)). The vehicle control device 100 is formed of a microcomputer which incorporates a CPU, a ROM, a RAM and the like. In this embodiment, the vehicle control device 100 is provided as a device which realizes avoidance or reduction collision damage by applying braking to the vehicle 1 by controlling brakes or the like. The vehicle control device 100 performs various arithmetic operations relating to a control of the vehicle 1.

The vehicle control device 100 stops an operation of the microcomputer when an ignition voltage of the vehicle 1 is lowered, and starts up the microcomputer when the ignition voltage of the vehicle 1 becomes again a start-up voltage threshold or more, and performs respective control processing. Accordingly, in a state where the ignition voltage is lowered, that is, in an engine stopped state, an operation of control processing is inhibited.

The stereoscopic camera 20 is formed of a pair of left and right cameras each of which uses a solid imaging element such as a charge coupled devices (CCD), for example. The stereoscopic camera 20 is mounted in the vicinity of a ceiling of a cabin, and images a mode of a road ahead of a vehicle, an obstacle and the like. Stereoscopic image data of the obstacle imaged by the stereoscopic camera 20 is transferred to an image processing chip disposed in the stereoscopic camera 20. The image processing chip acquires parallax information from an image (data), and calculates a distance between the own vehicle 1 and the obstacle ahead of the vehicle based on the acquired parallax information, and further, calculates a relative speed by differentiating the calculated distance corresponding to an elapsed time. Further, the image processing chip calculates a lateral position of the imaged obstacle with respect to the own vehicle 1, and calculates a lateral speed by differentiating the lateral position corresponding to an elapsed time. Further, using the image processing chip, pattern matching is performed with respect to image data based on the shape and the size of the obstacle so that the obstacle is classified into a pedestrian, a bicycle, a vehicle, other stopped obstacles and the like. The distance between the obstacle and the own vehicle 1 calculated in this manner, the relative speed, the lateral position, the lateral speed, and a type of the obstacle are transmitted to the vehicle control device 100 via a CAN or the like.

A rear stereoscopic camera 25 and side stereoscopic cameras 27 perform image processing and pattern matching in the same manner as the stereoscopic camera 20, and acquire information on a stereoscopic object around the own vehicle. The acquired information is transmitted to the vehicle control device 100 via the CAN or the like. However, the rear stereoscopic camera 25 and the side stereoscopic cameras 27 differ from the stereoscopic camera 20 with respect to the installing direction such that the rear stereoscopic camera 25 is installed so as to image the road behind the vehicle 1 and a mode of the obstacle, and the side stereoscopic cameras 27 are installed so as to image the mode of roads on left and right sides of the own vehicle 1 and the obstacle.

The brake control unit 30 is connected to the vehicle control device 100, and performs deceleration (braking) of the vehicle 1 by generating a friction between a wheel and a brake 60 which is connected to the brake control unit 30, specifically, by applying a pressure to a disk brake or a drum brake based on brake control information acquired from the vehicle control device 100. Further, the brake control unit 30 is connected to a brake pedal 61, a wheel speed sensor 62, a yaw rate sensor 64, a steering angle sensor 65 and an acceleration sensor 66 respectively. The brake control unit 30 performs the measurement of a driving situation of the vehicle 1 such as an own vehicle speed, and a driving operation situation of a driver such as a brake manipulation of the driver, a steering angle manipulation variable and the like, and transmits a result of the measurement to the vehicle control device 100.

The power train control unit 40 is connected to an engine 41 and a transmission 42 respectively. The power train control unit 40 measures an engine torque and a speed reduction ratio of the transmission using information acquired from the engine 41 and the transmission 42, and transmits a result of the measurement to the vehicle control device 100.

The meter control unit 70 is connected to a display device 71 and a buzzer 72 respectively. The meter control unit 70 performs notification warning or the like through visual or audio sense of a driver by operating the display device 71 or the buzzer 72 in response to a notification request acquired from the vehicle control device 100 via communication.

Next, control processing of the vehicle control device 100 is described with reference to FIG. 2.

Figure 2:
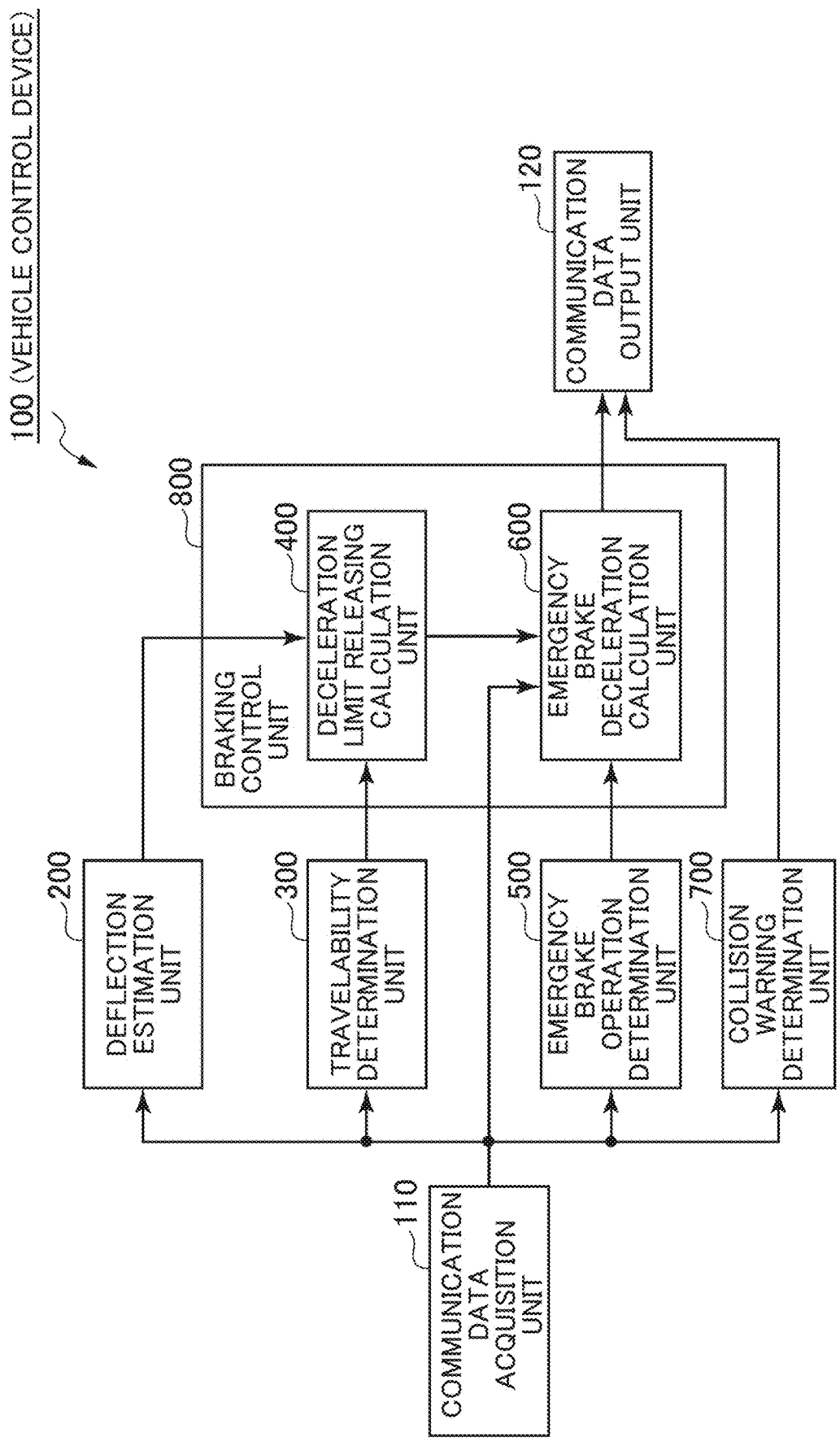
FIG. 2 is a functional block diagram of the vehicle control device according to this embodiment.

FIG. 2 is a functional block diagram which illustrates control processing performed by the vehicle control device according to this embodiment. As shown in the drawing, the vehicle control device 100 according to this embodiment is formed of a communication data acquisition unit 110, a communication data output unit 120, a deflection estimation unit 200, a travelability determination unit 300, an emergency brake operation determination unit 500, a collision warning determination unit 700, and a braking control unit 800. The braking control unit 800 includes a deceleration limit releasing calculation unit 400 and an emergency brake deceleration calculation unit 600.

To describe the respective functional blocks of the vehicle control device 100 schematically, the communication data acquisition unit 110 acquires: a type of an obstacle, a longitudinal direction of the obstacle and the own vehicle 1, a distance in the lateral direction and a relative speed acquired from the stereoscopic camera 20 and the rear stereoscopic camera 25; and a driving situation of the vehicle 1 such as an own vehicle speed, a brake manipulation of a driver and the like acquired from the brake control unit 30 and the power train control unit 40.

Next, the deflection estimation unit 200 estimates whether the generation of acceleration/deceleration (particularly a brake force) with respect to the own vehicle 1 brings about the generation of deflection (a change in the advancing direction) using information acquired by the communication data acquisition unit 110. The travelability determination unit 300 determines a non-travelable area and a travelable area of the own vehicle 1 (particularly an area disposed ahead of the own vehicle 1 on left and right sides) using information acquired by the communication data acquisition unit 110 in the same manner. Then, the deceleration limit releasing calculation unit 400 of the braking control unit 800 decides, based on the results acquired from the deflection estimation unit 200 and the travelability determination unit 300, an upper limit of the vehicle deceleration generated on the own vehicle 1 (hereinafter, also referred to as a deceleration limit value or a limit deceleration) from a relationship between the travelable area and the deflection with respect to the vehicle deceleration. In this case, in a situation where the generation of the deceleration does not bring about the generation of deflection or in a situation where the generation of deflection brought about by the generation of deceleration does not bring about intrusion of the vehicle 1 into the non-travelable area, the upper limit of the vehicle deceleration is set to a non-limited value, for example, a large value such as 15 [m/s$^2$]. On the other hand, when the generation of the vehicle deceleration momentarily brings about the generation of large deflection of the vehicle 1 and the travelable area is narrow, the upper limit of the vehicle deceleration is set to a value which is liable to be easily limited, for example, a small value such as 6 [m/s$^2$].

Further, the limit amount (value) is updated at a short cycle, for example, at an interval of 50 ms. By setting the limit amount (value) to a large value such that the shorter the distance between the obstacle and the own vehicle 1 so that an area where the deflection is generated between the obstacle and the own vehicle 1 is narrowed, the smaller the restriction applied to the vehicle deceleration becomes. By setting the limit amount (value) in this manner, it is possible to apply a large deceleration force while suppressing a deflection amount.

Next, the emergency brake operation determination unit 500 determines whether the position and a speed relationship which have a possibility of generating a collision between the obstacle and the own vehicle 1 are established using information acquired by the communication data acquisition unit 110, and determines that the emergency brake (also referred to as an automatic brake or collision damage alleviation brake) is to be operated in a situation where there is a possibility of the collision.

Next, the emergency brake deceleration calculation unit 600 of the braking control unit 800 determines the presence or the absence of an operation of the emergency brake first. When it is determined that there is no operation of the emergency brake, the deceleration at the time of applying an emergency brake is set to a value which requires no deceleration. On the other hand, when there is the operation of the emergency brake, the emergency brake deceleration calculation unit 600 calculates a deceleration force (deceleration, deceleration start timing and the like) necessary for avoiding collision damage corresponding to a positional relationship and a speed relationship between an obstacle and the own vehicle 1. When a collision cannot be avoided, the emergency brake deceleration calculation unit 600 calculates a deceleration force (deceleration, deceleration start timing and the like) which enables the reduction of collision damage. Further, at this point of time, the emergency brake deceleration calculation unit 600 limits the deceleration at the time of applying the emergency brake which is a calculation result by a deceleration limit value acquired from the deceleration limit releasing calculation unit 400.

In this embodiment, the combination of the deceleration limit releasing calculation unit 400 and the emergency brake deceleration calculation unit 600 described above is referred to as the braking control unit 800. The braking control unit 800 controls braking (deceleration) of the vehicle 1 by changing the deceleration at a time of applying an emergency brake of the vehicle 1 or deceleration start timing based on travelability determination result acquired by the travelability determination unit 300 and a deflection estimation result acquired by the deflection estimation unit 200.

Next, the collision warning determination unit 700 determines whether an obstacle is at a position and has a speed relationship so that approaching of the obstacle to the own vehicle 1 is to be warned using information acquired by the communication data acquisition unit 110.

Then, the communication date output unit 120 converts deceleration and the like at the time of applying the emergency brake which is the result acquired by the emergency brake deceleration calculation unit 600 and warning information which is the result acquired by the collision warning determination unit 700 into data in conformity with a communication protocol of the vehicle 1, for example, a format of CAN, and transmits the converted data to the CAN or the like of the vehicle 1.

In this manner, the vehicle control device 100 (the respective functional blocks of the vehicle control device 100) performs the processing described above. In the vehicle control device 100, as described in the flowchart shown in FIG. 3, processing ranging from P110 to P120 are performed in order from P110. Further, the flowchart shown in FIG. 3 indicates that a vehicle control can be performed in conformity with an environment around the vehicle, a driving situation of the vehicle and a driving manipulation which change every moment by repeat performing the processing at a short cycle, for example, a cycle of 50 ms during a period that the microcomputer is being operated.

Figure 3:
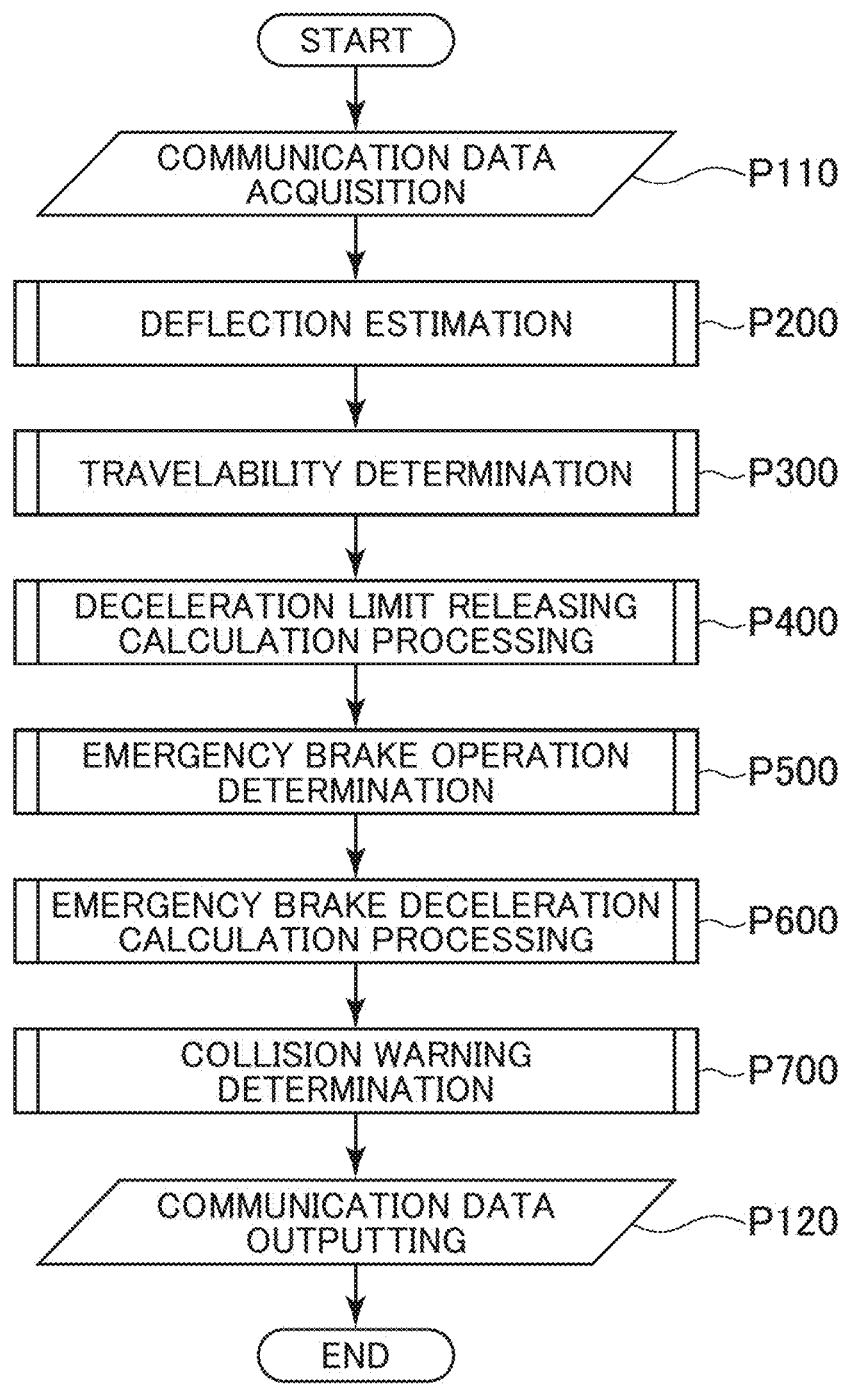
FIG. 3 is a flowchart showing processing performed by the vehicle control device according to this embodiment.

Hereinafter, processing from P110 to P120 indicated in the flowchart shown in FIG. 3 are described in detail.

(Communication Data Acquisition Processing P110)

First, the communication data acquisition processing P110 is described. In the communication data acquisition processing P110 performed by the communication data acquisition unit 110, a type of obstacle, a longitudinal direction of an obstacle and the own vehicle 1, a distance in a lateral direction and a relative speed are acquired from the stereoscopic camera 20 and the rear stereoscopic camera 25. A driving situation of the vehicle 1 such as an own vehicle speed and a driving manipulation situation such as a brake manipulation of a driver are acquired from the brake control unit 30. Such acquired values are converted into data so that the values can be used in processing P200 and succeeding processing.

When a noise occurs in communication data so that the data is changed into abnormal data, error detection is applied to communication data by a circulating redundancy detection (CRT), parity, or a checksum, and the abnormal data is discarded so as to prevent the propagation of the abnormal data to the processing including processing 200 and the succeeding processing. Further, under a situation where information of a sensor takes an abnormally large value or an abnormally small value, a system is incorporated which prevents runaway of a control and the occurrence of abnormal processing by limiting the numerical value.

(Deflection Estimation Processing P200)

Figure 4:
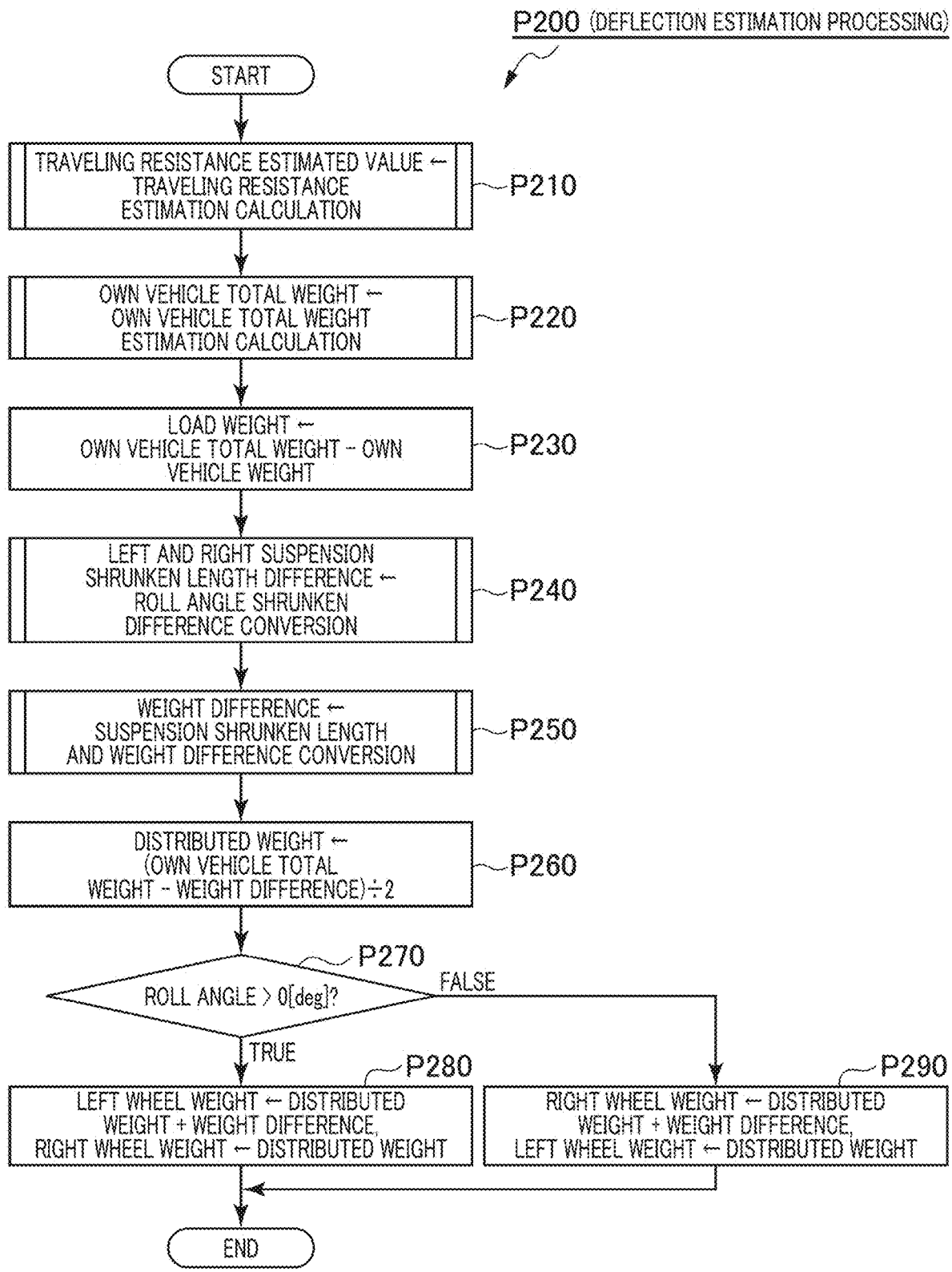
FIG. 4 is a flowchart showing deflection estimation processing.

Next, the deflection estimation processing P200 is described with reference to FIG. 4.

In the deflection estimation processing P200 by the deflection estimation unit 200, first, a weight of a loaded object on the vehicle 1 is estimated. For this estimation, a traveling resistance of the own vehicle 1 is estimated in processing P210. An estimated value of the traveling resistance can be calculated based on a speed of the own vehicle, the shape of the vehicle (air resistance characteristic), and a sum of air rolling resistance acquired from a width of a tire, a gradient resistance acquired from a road surface gradient, and a cornering resistance acquired based on the generation of lateral acceleration.

Next, an own vehicle total weight is estimated in processing P220. The own vehicle total weight is a total value of a weight of the vehicle 1 and a weight of a loaded object. The loaded object indicates a load or occupants including a driver. An estimated weight of the own vehicle 1 is acquired based on an engine torque, a speed reduction ratio of a transmission, an estimated value of a traveling resistance, a dynamic radius of a tire and a longitudinal direction acceleration of the own vehicle (hereinafter, simply described as own vehicle acceleration). Own vehicle acceleration used in this processing is calculated from a change amount of an own vehicle speed for every cycle which is acquired based on a value of the wheel speed sensor 62. For example, the estimated weight of the own vehicle (the own vehicle total weight) is expressed by a following formula (1).

Own vehicle total weight=(engine torque×speed reduction ratio÷tire dynamic radius−traveling resistance estimated value)÷own vehicle acceleration (1)

There is a tendency that values of the engine torque, the speed reduction ratio, the traveling resistance estimated value, and the own vehicle acceleration are largely changed due to the deviation of measurement timing or the generation of a sensor noise. Accordingly, a sudden change of the own vehicle total weight is prevented by performing primary delay filter processing after the own vehicle total weight is acquired using the formula (1). Further, in the following scenes a to e, the estimation of the weight cannot be accurately performed using the formula (1) and hence, it is preferable to provide a condition which stops updating of the own vehicle total weight.

(scene a) a case where an engine torque is small (scene b) a case where a gear position is not at an advancing position (drive range)

(scene c) a case where a steering angle is largely inclined either to a left side or a right side.

(scene d) a case where a deceleration force by a brake is generated (scene e) a case where a deceleration force is generated by an auxiliary brake Next, a load weight is acquired in processing P230. A weight of the vehicle excluding the weight of the loaded object can be acquired by storing the weight of the vehicle in the ROM as a parameter set in advance for every vehicle type based on vehicle data of a mounting vehicle type. Further, the weight of the loaded object can be acquired by the following formula (2) from the formula (1) and the weight of the vehicle read from the ROM.

Load weight=own vehicle estimation weight−weight of vehicle (2)

Next, the distributed weights applied to left and right suspensions of the vehicle 1 is estimated. In estimating the weight distribution, first, in processing P240, shrunken lengths of the left and right suspensions (left and right suspension shrunken lengths) are acquired from a roll angle of the own vehicle 1.

A method of acquiring a roll angle of the own vehicle 1 is described with reference to FIG. 5. An image described in a PCT1 in FIG. 5 an image of an area disposed ahead of the vehicle 1 when the image is imaged by the stereoscopic camera 20 in a case where the weight distribution is performed uniformly on left and right sides of the vehicle 1. On the other hand, an image described in a PCT2 in FIG. 5 is an image of the area disposed ahead of the vehicle 1 when the image is imaged by the stereoscopic camera 20 in a case where a load weight is offset to the right side of the vehicle 1. Compared to the PCT1, in the PCT2, a right side of a screen is lowered with respect to a left side of the screen. A ground horizontal plane is extracted from the image by image processing. When the vehicle 1 has no roll angle, the position of the ground horizontal plane becomes the position on a line HL2. However, when a loading situation is offset to the right side so that a roll angle is generated in the vehicle 1, the position of the ground horizontal plane becomes the position on a line HL1. Accordingly, the roll angle of the own vehicle 1 can be acquired by calculating an angle θ made by the line HL1 and the line HL2. In this case, assuming an advancing direction of the vehicle 1 as a front side, the roll angle is expressed as a positive value when the left side is lowered, and is expressed as a negative value when the right side is lowered. In the case shown in the PCT2, when an absolute value of the angle θ is 5[deg], for example, the roll angle becomes −5[deg]. Due to pitching movement at a time of accelerating or decelerating the vehicle 1 at the point of time that a load is loaded on the own vehicle 1, when the angle θ is acquired from one image, an error becomes large. Accordingly, updating of the roll angle is not performed at a timing that acceleration or deceleration of the own vehicle is small. Also in a case where, when vertical vibrations or a change in roll angle are generated due to unevenness of a road surface during traveling, when the angle θ is acquired from one image, an error becomes large. Accordingly, it is desirable that a change in the roll angle be made gentle by applying a primary delay filter or moving average processing to the roll angle. The processing which estimates the roll angle is performed in the stereoscopic camera 20, and the calculated roll angle is transmitted to the vehicle control device 100 via communication, and is used in processing P240. In the same manner as the weight of the vehicle, a distance between the left and right tires (tread) is stored in the ROM as a parameter set in advance for every vehicle type based on vehicle data of a vehicle mounting type. In processing P240, the difference between shrunken lengths of the left and right suspensions (left and right suspension shrunken length difference) is acquired based on the roll angle and the tread.

Specifically, the difference between the shrunken lengths of the left and right suspensions is acquired by the following formula (3)

$$\text{Left and right suspension shrunken length difference} = \text{tread} \times \tan(\text{roll angle}) \quad (3)$$

When the right suspension is shrunken, the left and right suspension shrunken length difference takes a negative value, and the shrunken length of the right suspension becomes short by an amount of the left and right suspension shrunken length difference with respect to the shrunken length of the left suspension. For example, in a case where the left and right suspension shrunken length difference is −0.02[m], and the shrunken length of the left suspension is 0.05[m], the shrunken length of the right suspension becomes 0.05[m]−(−0.02[m])=0.07 m.

Next, in processing P250, the weight difference which is generated on the left and right wheels is calculated based on the left and right suspension shrunken length difference.

The left and right suspension shrunken length difference of the suspensions is proportional to the difference between the weights supported by the respective left and right suspensions, and characteristics of the suspensions depend on a mounting vehicle type. Accordingly, the relationship between the weight difference and the left and right suspension shrunken length difference is measured in advance by an experiment or the like, and the measured relationship is stored in the ROM in advance as a parameter of table values. Then, in processing P250, the left and right weight difference is acquired by looking up the table values using the left and right suspension shrunken length difference acquired by processing P240.

Next, in processing P260, the weights which are uniformly distributed to the left and right wheels are calculated. The distributed weights on the left and right wheels are acquired by the following formula (4).

$$\text{Distributed weight} = (\text{own vehicle total weight} - \text{weight difference}) \div 2 \quad (4)$$

Next, in processing P270, a tilting direction of the own vehicle 1 (with respect to a road surface) is determined based on a roll angle, and which of the left and right wheels supports the weight difference is determined. In a case where the roll angle is larger than θ [deg], the weight is supported by the left wheel and hence, processing advances to processing P280 where the left wheel weight is set to the distributed weight+the weight difference, and the right wheel weight is set to the distributed weight. In a case where the roll angle is less than θ [deg] in processing P270, the weight is supported by the right wheel and hence, processing advances to processing P290 where the right wheel weight is set to the distributed weight+the weight difference, and the left wheel weight is set to the distributed weight.

In this manner, the left wheel weight and the right wheel weight are estimated as a loaded state of the vehicle 1 as the deflection estimation result (that is, the result where the deflection of the vehicle 1 due to the generation of a brake force applied to the vehicle 1 is estimated), and the weight of the left wheel and the weight of the right wheel are estimated and the estimation is used in the following processing.

(Travelability Determination Processing P300)

Figure 6:
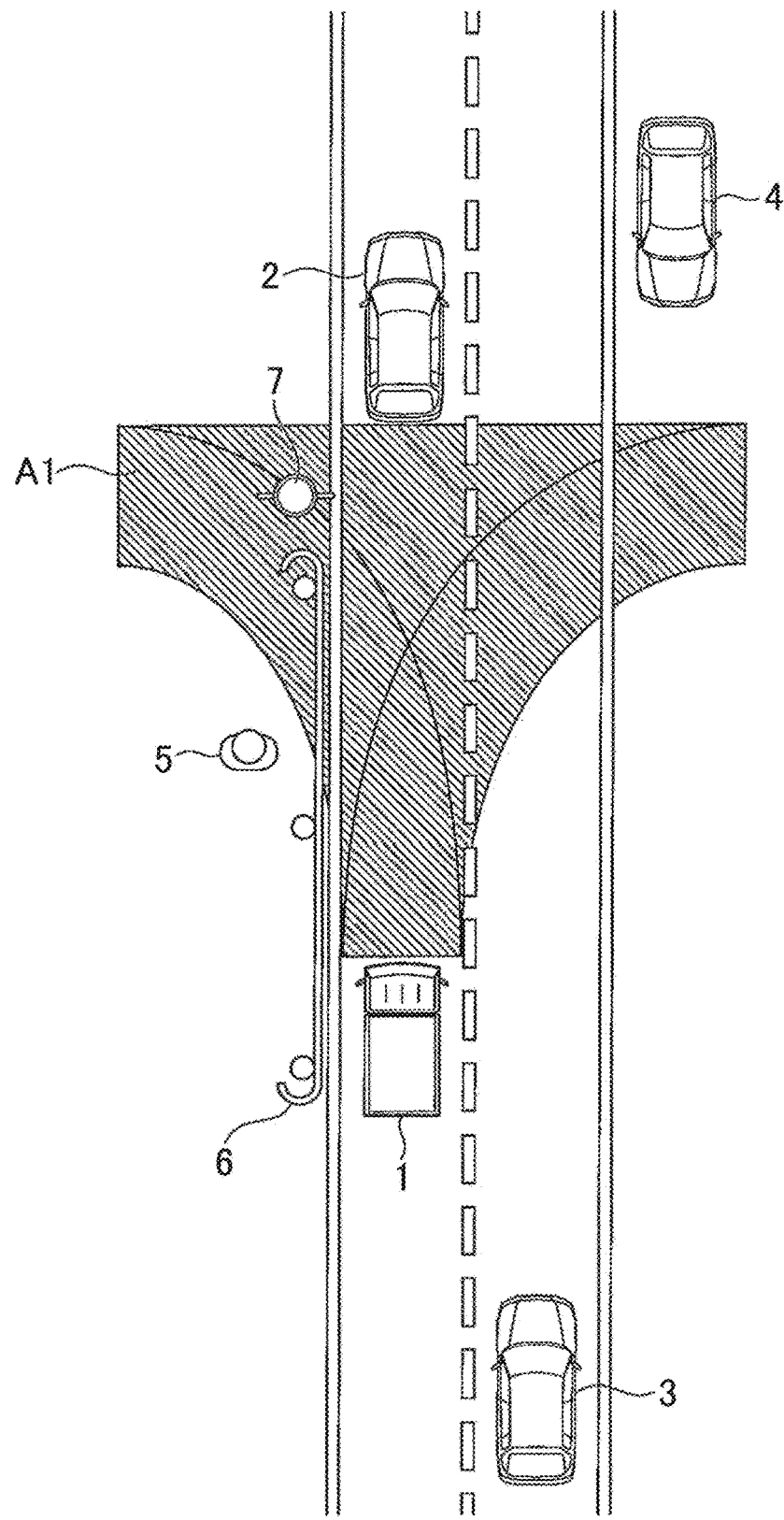
FIG. 6 is a bird's eye view showing one example of surrounding of the own vehicle for describing a travelable area.

Next, in describing travelability determination processing P300 of the own vehicle 1, the definition of a travelable area (or non-travelable area) is described with reference to FIG. 6. FIG. 6 is a bird's eye view showing one example of a situation of the own vehicle 1 and surrounding of the own vehicle 1 for describing a travelable area of the own vehicle 1.

Figure 7:
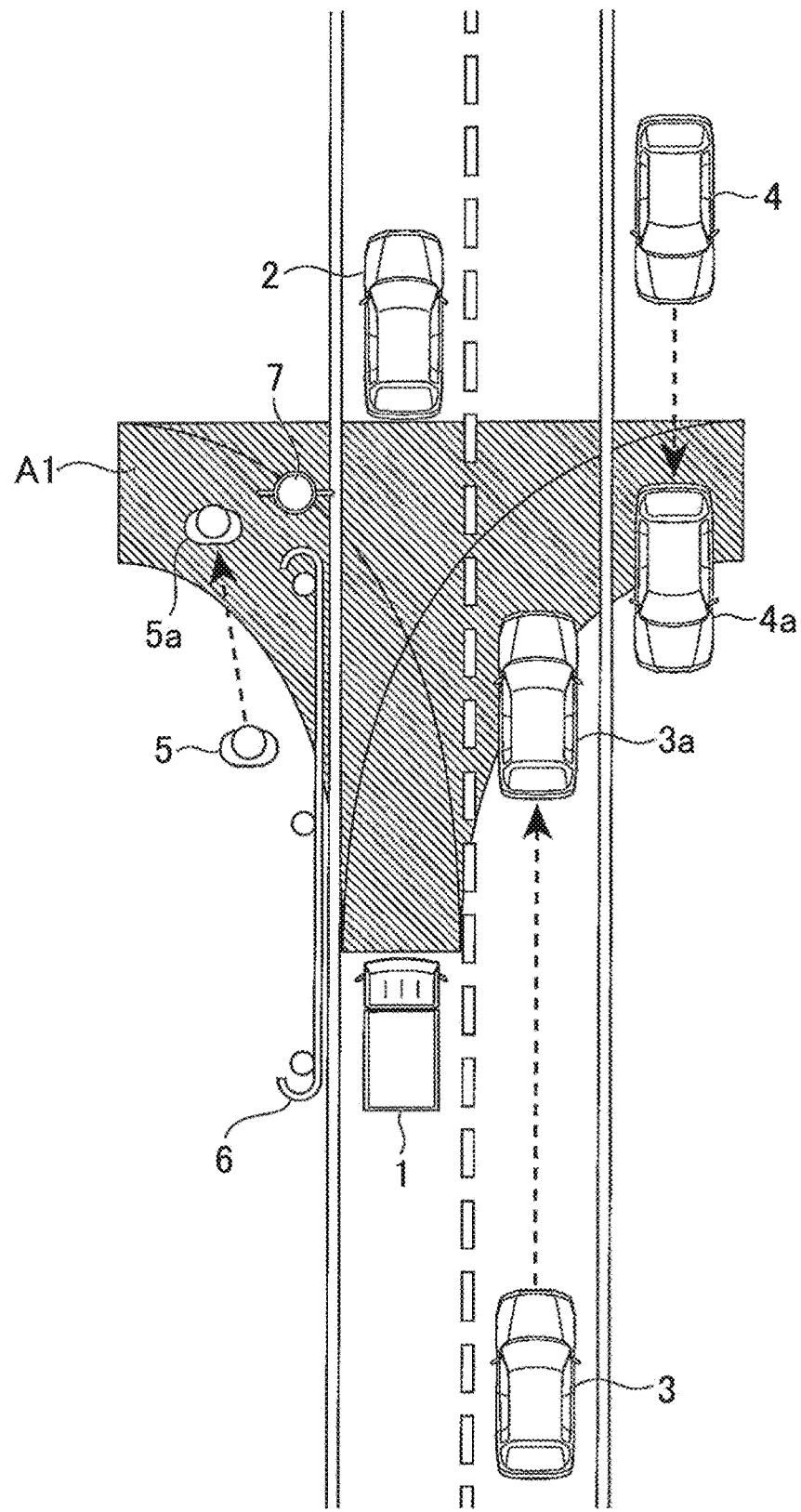
FIG. 7 is a bird's eye view showing an example in which prediction is added to the surrounding of the own vehicle for describing a travelable area.
Figure 8:
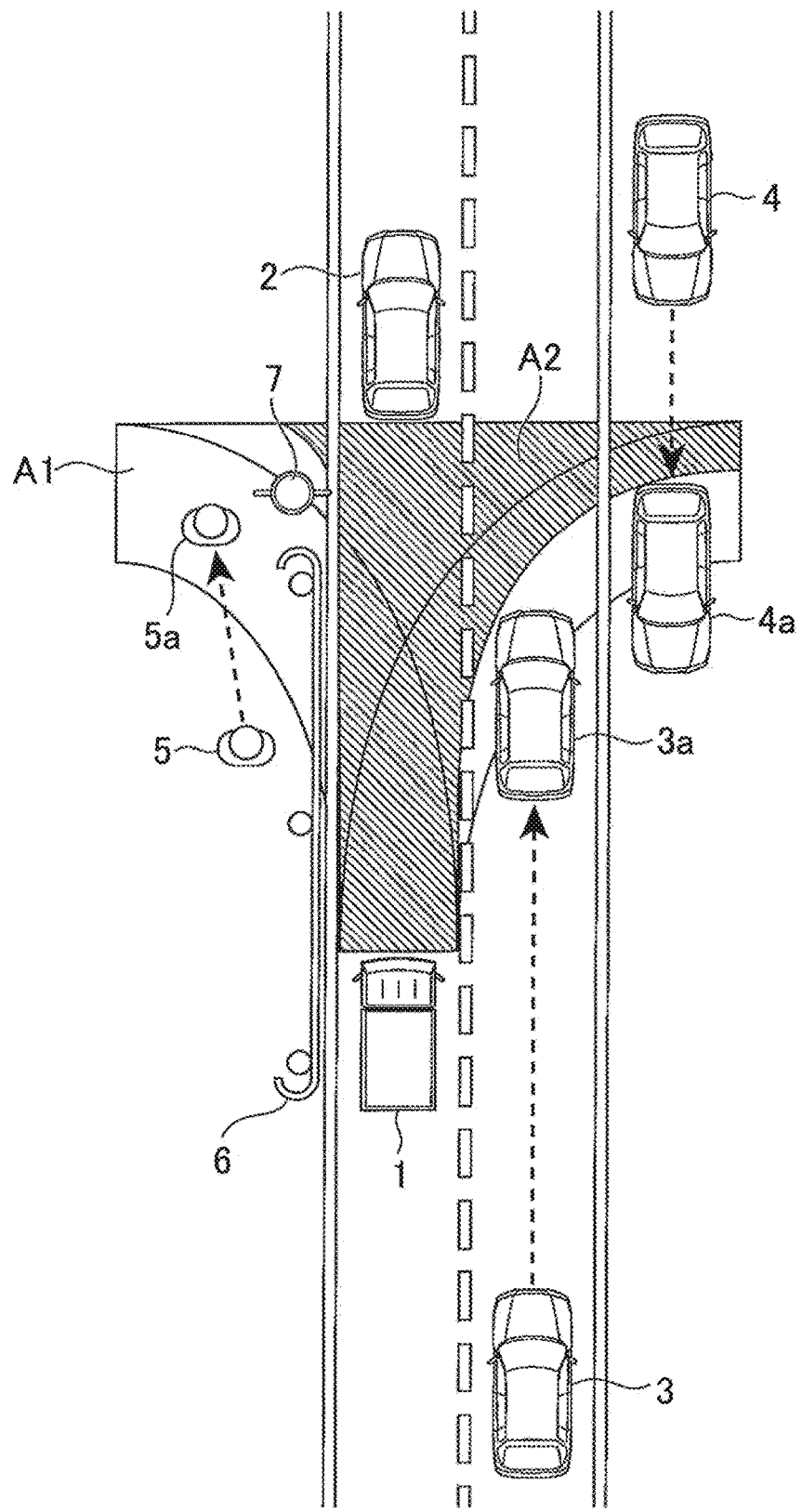
FIG. 8 is a bird's eye view showing a result acquired by applying a determination result to one example of the surrounding of the own vehicle for describing a travelable area.

When the own vehicle 1 advances, the stopped vehicle 2 exists ahead of the own vehicle. In a case where sudden braking is applied to the own vehicle 1, when the center of gravity of the own vehicle 1 is offset to either a left side or a right side, an area A1 which is indicated by a hatched line is an area having a possibility that the own vehicle 1 advances to the area. With respect to the inside of such an area, it is estimated that stereoscopic objects which move such as an oncoming vehicle 4, another vehicle 3 which travels in the same direction as the own vehicle 1 on a neighboring lane (hereinafter described as a neighboring vehicle 3), a pedestrian 5, and a bicycle or a motorcycle not shown in the drawing enter the area. Then, an area where it is assumed that these stereoscopic objects enter the area at a point of time (timing) at which the own vehicle 1 reaches the area, and an area where it is estimated that these stereoscopic objects already have existed and will exist until a point of time (timing) at which the own vehicle 1 will reach are determined to be a non-travelable area. For example, it is estimated that the oncoming vehicle 4, the neighboring vehicle 3 and the pedestrian 5 move to positions (an oncoming vehicle 4*a*, a neighboring vehicle 3*a*, a pedestrian 5*a*) shown in FIG. 7 after a lapse of a fixed time, and enter the area A1. An estimation method used here will be described later. Further, besides the objects which move, a guardrail 6, a utility pole 7, and stereoscopic objects which do not move such as a wall, blocks which separate a sideway and a vehicle road, and a road sign which are not shown in the drawing are also determined as a non-travelable area when these objects exist in the area indicated by A1. Further, with respect to the area A1, also in a case where a surface which is considerably lower than a traveling surface of the own vehicle 1, that is, an area such as a cliff or a groove exists (in other words, the area where a road surface on which the own vehicle 1 is travelable does not exist), such an area is determined as a non-travelable area. The area A1 which is not determined as the above-mentioned non-travelable area is determined as the travelable area. Further, when the travelable area is disposed remoter than the non-travelable area as viewed from the own vehicle 1, the area is determined as the non-travelable area. The travelable area in the case shown in FIG. 7 becomes an area A2 indicated by a hatched line in FIG. 8. With respect the area indicated by A1, an area which does not overlap with the area indicated by A2 is determined as the non-travelable area.

Figure 9:
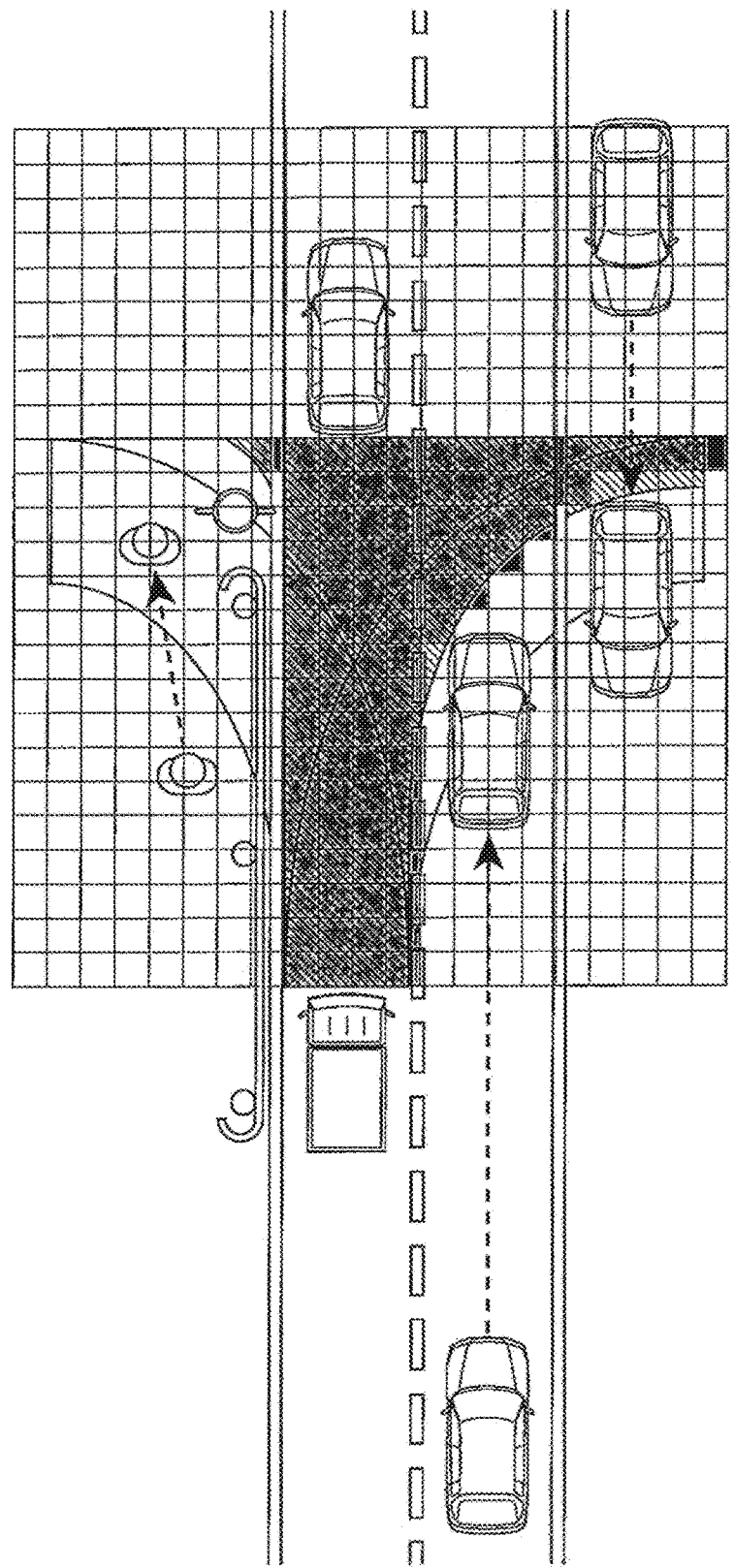
FIG. 9 is a bird's eye view showing a result in the form of data acquired by applying the determination result to one example of the surrounding of the own vehicle for describing a travelable area.

Further, on software, in classifying the travelable area and the non-travelable area, as shown in FIG. 9, an area disposed ahead of the own vehicle 1, that is, a range of 100[m]×20[m]

which has a size of 100[m] in a frontward direction and a size of 10[m] on the left and right directions respectively is determined as a two-dimensional array by dividing the range in a grid shape. In a case where the vehicle is travelable, a value of 0 is set in the array, and in a case where the vehicle is not travelable, a value other than 0 is set.

Further, a coordinate system of respective arrangement positions with respect to the own vehicle 1 (travelability determination array) is described with reference to FIG. 10. First, regarding the lateral position with respect to the own vehicle 1, the lateral center position of the own vehicle 1 is set as zero, and the left direction is set as "positive" and the right direction is set as "negative". Regarding the longitudinal direction position, a distal end position (a front end position) of a front bumper of the own vehicle 1 is set as 0, and the direction away from the own vehicle 1 in the frontward direction is set as "positive". With respect to a stereoscopic object or an obstacle for determining a non-travelable area, by taking the stopped vehicle 2 which is the obstacle as an example, the positional information with respect to the own vehicle 1 is indicated by the position expressed by 2Pos. The lateral position of the 2Pos indicates the center of the object in the lateral width, and the longitudinal direction position is the position of a rear end of the stopped vehicle 2. Further, in the drawing, the lateral width is defined as a length 2y and the longitudinal width is defined as a length 2x.

Figure 11:
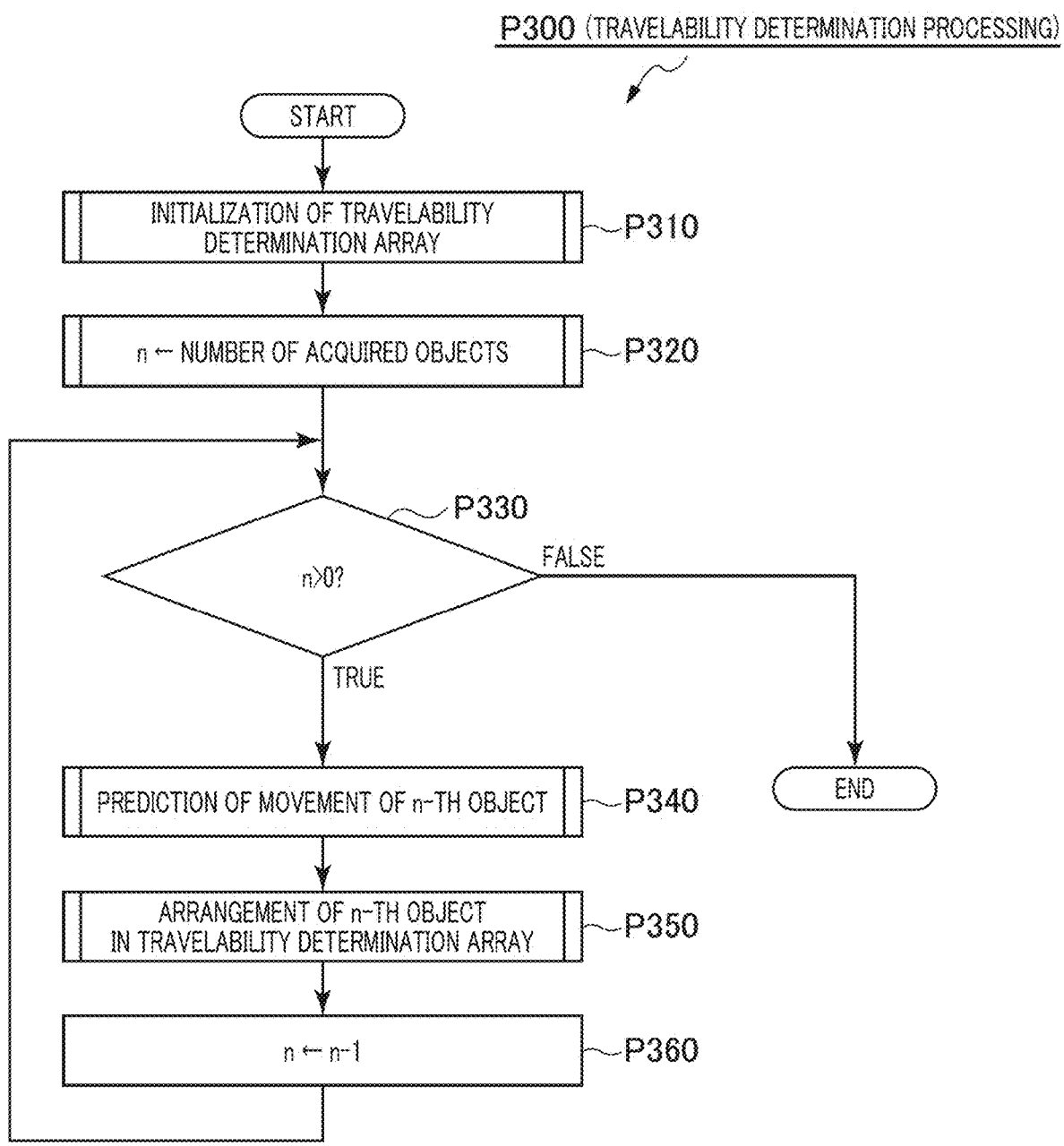
FIG. 11 is a flowchart showing travelability determination processing.

Next, travelability determination processing P300 is described with reference to FIG. 11.

In the travelability determination processing P300 performed by the travelability determination unit 300, first, in processing P310, the entire area of the travelability determination array is initialized to a value of zero as a state where the vehicle is travelable.

Next, in processing P320, the number of objects detected by the stereoscopic camera 20 and the like is acquired, and the number of objects is set as a variable n. Here, the number of objects is a total number of moving bodies such as oncoming vehicles 3, neighboring vehicles 4, pedestrians, stereoscopic bodies such as guide rails 6 and utility poles 7, and cliffs and grooves all of which are acquired from the vehicle external field recognition sensors such as the stereoscopic camera 20. Next, the processing advances to processing P330 where it is checked whether the variable n is 0 or more. When the variable n is 0 or less, it is determined that the objects which are not processed no more exist, and processing P300 performed by the travelability determination unit 300 is finished. When the variable n is larger than 0, the processing advances to P340 and, thereafter, processing P350 is performed. Further, after processing P340 and processing P350 are performed, the variable n is decremented by 1 in processing P360, and the processing returns to processing P330. Accordingly, all objects detected by the stereoscopic camera 20 and the like are sequentially processed.

In processing P340, a moving position of the object detected by the stereoscopic camera 20 and the like is estimated. In the case shown in FIG. 7, moving of the oncoming vehicle 4 to the position of an oncoming vehicle 4a is predicted. In the prediction of a moving (a moving speed and a moving direction), an object which is a subject of this processing is imaged by the stereoscopic camera 20, and an image acquired by a result of such imaging is processed so that a parallax image is acquired. As a result, with respect to a stereoscopic object, the position of the own vehicle 1 and the position of the object in the longitudinal direction can be acquired from an amount of parallax.

Further, by determining which position the object is imaged in the lateral direction of the image, the position of the own vehicle 1 and the position of the object in the lateral direction can be acquired. Then, the longitudinal direction position and the lateral direction position are acquired continuously along with a lapse of time, and a difference between the longitudinal direction position and the lateral direction position at predetermined timing and the longitudinal direction position and the lateral direction position which are acquired a fixed time before the predetermined timing is taken so that moving speeds of the object which is the subject of the processing in the longitudinal direction and the lateral direction with respect to the own vehicle 1 can be acquired. Further, by performing pattern matching on the objects in the imaged image, the objects are classified into moving bodies such as a pedestrian, a back surface of a vehicle, a front surface of the vehicle, a side surface of the vehicle, a bicycle or a motorcycle, and objects of a type such as stereoscopic objects which are not moving bodies such as guard rails or utility poles. These information are measured and determined by the stereoscopic camera 20 with respect to the respective objects, and are transmitted to the vehicle control device 100. The transmitted information on the objects are first corrected with respect to moving speeds of the objects based on a result of classification to the pedestrian, the back surface of the vehicle and the like. For example, in case of the object which matches the pedestrian, it is predicted that the moving speed changes to 4 [km/h] in one direction among the frontward direction, the backward direction, the left direction and the right direction from a state that the pedestrian has not moved. Accordingly, the moving speeds in the frontward direction, the backward direction, the left direction and the right direction are corrected such that the object moves at a speed of 4 [km/h] with respect to the area A1. Further, for example, in a case where the moving object travels on the back surface of the vehicle, although it can be predicted that the moving speed changes in the frontward direction, the moving of the object in the left or right direction is extremely small and a possibility that the moving object changes its moving in the rearward direction is low. Accordingly, a moving speed of the moving object is corrected such that the moving object moves in the frontward direction of the own vehicle 1. By acquiring the position and the speed of the moving body in this manner, the position of the object can be estimated while taking into account a lapse of time. In performing the prediction of the moving, when the object is not the moving body as a result of classification, it is unnecessary to predict moving and hence, the correction is not performed. With respect to the object which is not a stereoscopic object such as a cliff or a groove, a parallax amount is decreased compared to a case where a plane having the same height as a plane on which the own vehicle 1 travels is imaged on an image so that a result is acquired that the object is remote from the own vehicle 1. The existence of the cliff or the groove is detected based on the result, and the object is detected as an object for determining a non-travelable area of the own vehicle 1.

Figure 12:
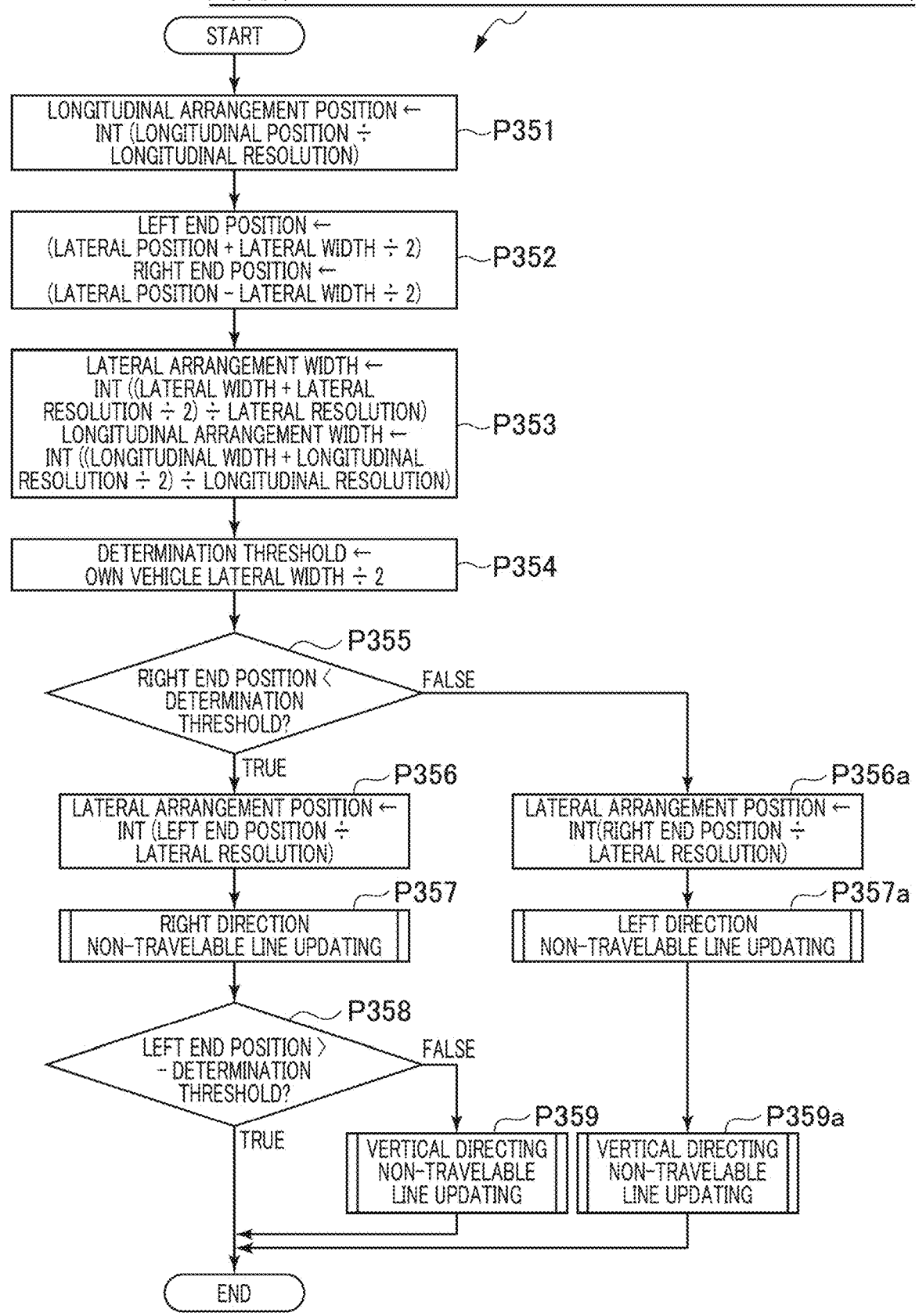
FIG. 12 is a flowchart showing arrangement processing for acquiring the travelability determination array.

Next, in processing P350, with respect to the travelability determination array, the object which is processed in processing P340 is arranged based on the longitudinal direction position and the lateral direction position with respect to the own vehicle 1, the longitudinal direction moving speed, the lateral direction moving speed, a longitudinal width and a lateral width of the object and a type of object so that the travelability determination array is updated. The content of processing P350 is described with reference to FIG. 12.

First, in processing P351, the longitudinal arrangement position of the object is calculated. The longitudinal arrangement position can be acquired by dividing the longitudinal position by a longitudinal resolution and by rounding up a value acquired by division to the nearest integer. The longitudinal resolution used at this time becomes a width per one arrangement in the longitudinal arrangement position direction of the travelability determination array, and is defined as a constant such as 0.5 [m], for example. Next, the processing advances to processing P352 where the left end position and the right end position of the object are calculated. The left end position is the position which is acquired by adding a half of the lateral width to the lateral position, and the right end position is a position which is acquired by subtracting the half of the lateral width from the lateral position. Next, the processing advances to processing P353 where the lateral width is divided by a lateral resolution and a value acquired by the division is rounded up to the nearest integer to obtain the lateral arrangement width. The lateral resolution used at this time becomes a width per one arrangement in the lateral arrangement position direction of the travelability determination array in the same manner as the longitudinal resolution, and is defined as a constant such as 0.1 [m], for example. In the same manner, the longitudinal width is divided by the longitudinal resolution, and a value acquired by division is rounded up to the nearest integer to obtain the longitudinal arrangement width. Next, the processing advances to processing P354 where as a determination threshold used in determination P355 and determination P358, a value which is a half of the vehicle width (lateral width) is set.

Next the processing advances to the determination P355 where it is determined whether the right end position of the object is smaller than the determination threshold, that is, whether the right end position of the object is on a right side of the left end position of the own vehicle 1. As a result of the determination, when the right end position of the object is on the right side of the left end position of the own vehicle 1, the processing advances to processing P356. When the right end position of the object is on the left side of the left end position of the own vehicle 1, the processing advances to processing P356*a*. In processing P356, as the lateral arrangement position indicating the position of the object on the arrangement, the left end position is divided by the lateral resolution, and a value acquired by the division is rounded up to the nearest integer to obtain the lateral arrangement position. Next, the processing advances to processing P357 where the travelability determination array is updated. In right direction non-travelable line updating processing in processing P357, by setting the lateral arrangement position calculated in processing P356 and the longitudinal arrangement position calculated in processing P351 as a start point of the arrangement position, values of the arrangement to the lateral arrangement width calculated in processing P353 toward the right direction, that is, toward the negative direction are set non-travelable.

Next, in determination P358, it is determined whether the left end position is larger than a negative determination threshold, that is, whether the left end position of the object is on a left side of the right end position of the own vehicle 1. In the determination P358, the determination is made only when the right end position of the object is on a right side of the left end position of the own vehicle 1 as a result of determination 355. The determination made in determination P358 that the left end position of the object is on the left side of the right end position of the own vehicle 1 means that when the own vehicle 1 advances straight forward, an object exists at a collision position. In this case, a surface of the object which is determined as a non-travelable area becomes only a back surface of the object. Since the non-travelable area which indicates the back surface of the object is set in processing P357 and hence, processing P350 is finished.

On the other hand, in a case where it is determined that the left end position of the object is not on the left side of the right end position of the own vehicle 1 in the determination P358, when the direction of the own vehicle 1 changed to a right side, there is a possibility that the own vehicle 1 advances toward a left side surface of the object and hence, the processing advances to processing P359. In processing P359, a non-travelable area in the longitudinal direction is set with respect to the travelability determination array. By setting the lateral arrangement position calculated in processing P356 and the longitudinal arrangement position calculated in processing P351 as a start point of the arrangement position, values of the arrangement to the longitudinal arrangement width calculated in processing P353 toward the front direction, that is, toward the positive direction are set non-travelable, and processing P350 is finished.

In a case where it is determined that the right end position of the object is not on the right side of the left end position of the own vehicle 1 in determination P355, the processing advances to processing P356*a*. In processing P356*a* and processing P357*a*, the lateral direction of the processing performed in processing P356 and processing P357 is reversed, and in processing P356*a*, as the lateral arrangement position which indicates the position of the object on the arrangement, the right end position is divided by a lateral resolution, and a value acquired by the division is rounded up to the nearest integer to obtain the lateral arrangement position. Next, the processing advances to processing P357*a*. In left direction non-travelable line updating processing in processing P357*a*, by setting the lateral arrangement position calculated in processing P356*a* and the longitudinal arrangement position calculated in processing P351 as a start point of the arrangement position, values of the arrangement to the lateral arrangement width calculated in processing P353 toward the left direction, that is, toward the positive direction are set non-travelable.

Next, the processing advances to processing 359*a*. A non-travelable area in the longitudinal direction is set with respect to the travelability determination array. By setting the lateral arrangement position calculated in processing P356*a* and the longitudinal arrangement position calculated in processing P351 as a start point of the arrangement position, values of the arrangement to the longitudinal arrangement width calculated in processing P353 toward the front direction, that is, toward the positive direction are set non-travelable, and processing P350 is finished.

Further, the position of the start point is set non-travelable in processing P357 in a case where processing P359 is performed and in processing P357*a* in a case where processing P359*a* is performed. Accordingly, it is unnecessary to set the start point non-travelable again and hence, it is preferable that updating is started from the arrangement position which be incremented by plus 1 in the frontward direction from the start point.

In the role of setting the travelability determination array, the processing of the determination P355 and the processing succeeding to the determination P355 become complicated. In the role of setting the travelability determination array, such a role can be performed by setting the travelability determination array non-travelable such that a quadrangular shape is depicted by the lateral arrangement width and the longitudinal arrangement width acquired in processing P353 using the longitudinal arrangement position and the lateral arrangement position acquired by converting the left end position calculated in processing P352 in processing P356 as a start point. However, the vehicle control device 100 is in general characterized that the increase of a processing load is maintained minimum so that the generation of heat of the microcomputer is suppressed, and an inexpensive microcomputer is desirably used even when processing performance is low. Accordingly, it is desirable to adopt the configuration succeeding to the determination P355 such that only a surface projected from the own vehicle is set as a non-travelable area.

Travelability determination processing P300 performed by the travelability determination unit 300 has been described. In this embodiment, the travelability determination processing P300 is mainly performed with respect to an area disposed ahead of the vehicle 1 on left and right sides of the vehicle 1.

The area disposed ahead of the vehicle 1 on left and right sides of the vehicle 1 is formed of: an area disposed ahead of the vehicle 1 on a left side; and an area disposed ahead of the vehicle 1 on a right side of the vehicle 1, both of which are detected by the stereoscopic camera 20 and the like (vehicle external field recognition sensors) which monitor the front side of the vehicle (a traveling environment of the vehicle 1) and are mounted on the vehicle 1. The area disposed ahead of the vehicle 1 on the right side mainly indicates an area on a front side than a front end of the vehicle 1 and on a right side than a right end of the vehicle 1, and the area disposed ahead of the vehicle 1 on the left side mainly indicates an area on a front side than the front end of the vehicle 1 and on a left side than a left end of the vehicle 1.

(Deceleration Limit Releasing Calculation Processing P400)

Figure 13:
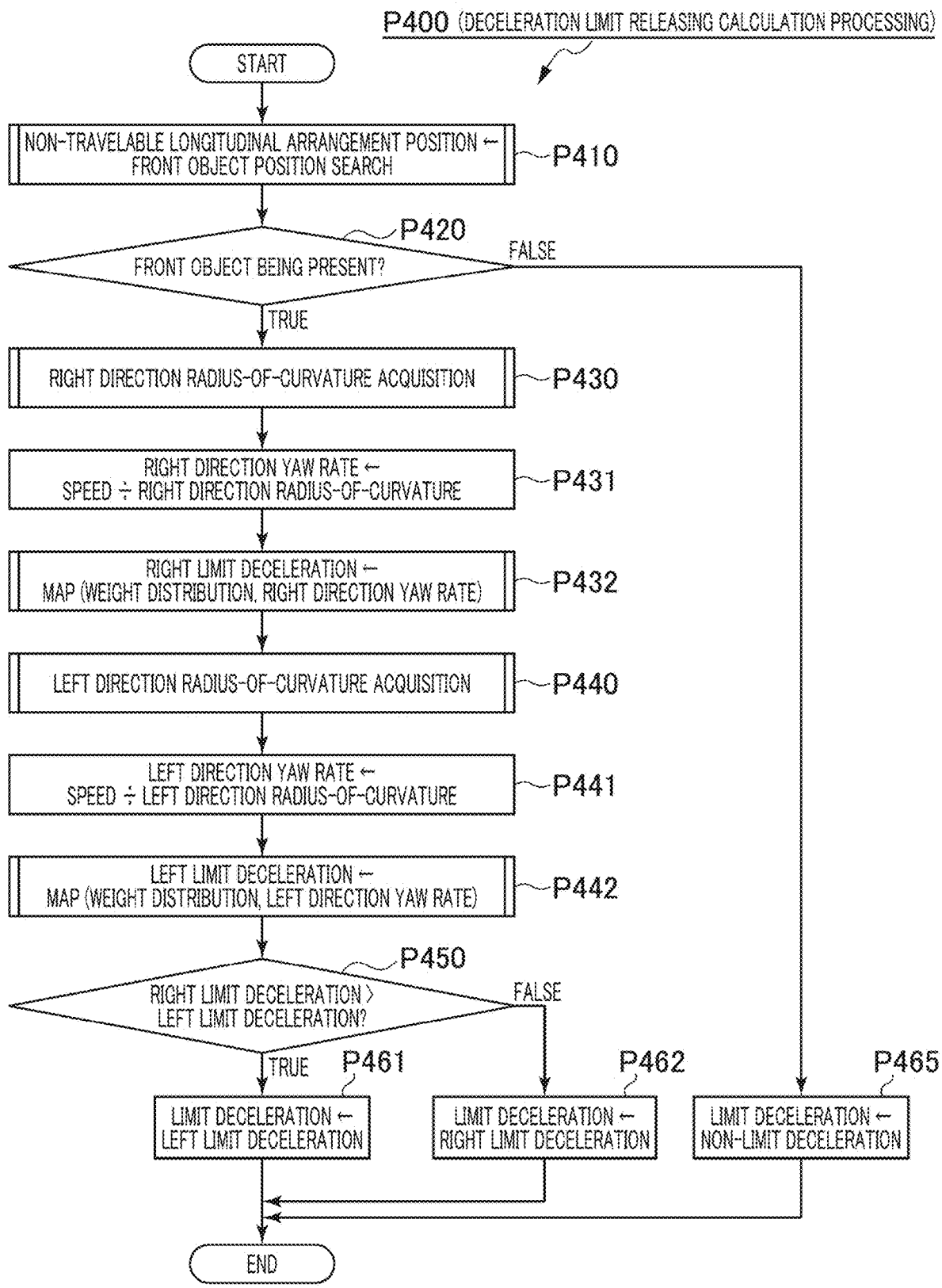
FIG. 13 is a flowchart showing deceleration limit releasing calculation processing.

Next, deceleration limit releasing calculation processing P400 is described with reference to FIG. 13.

Figure 10:
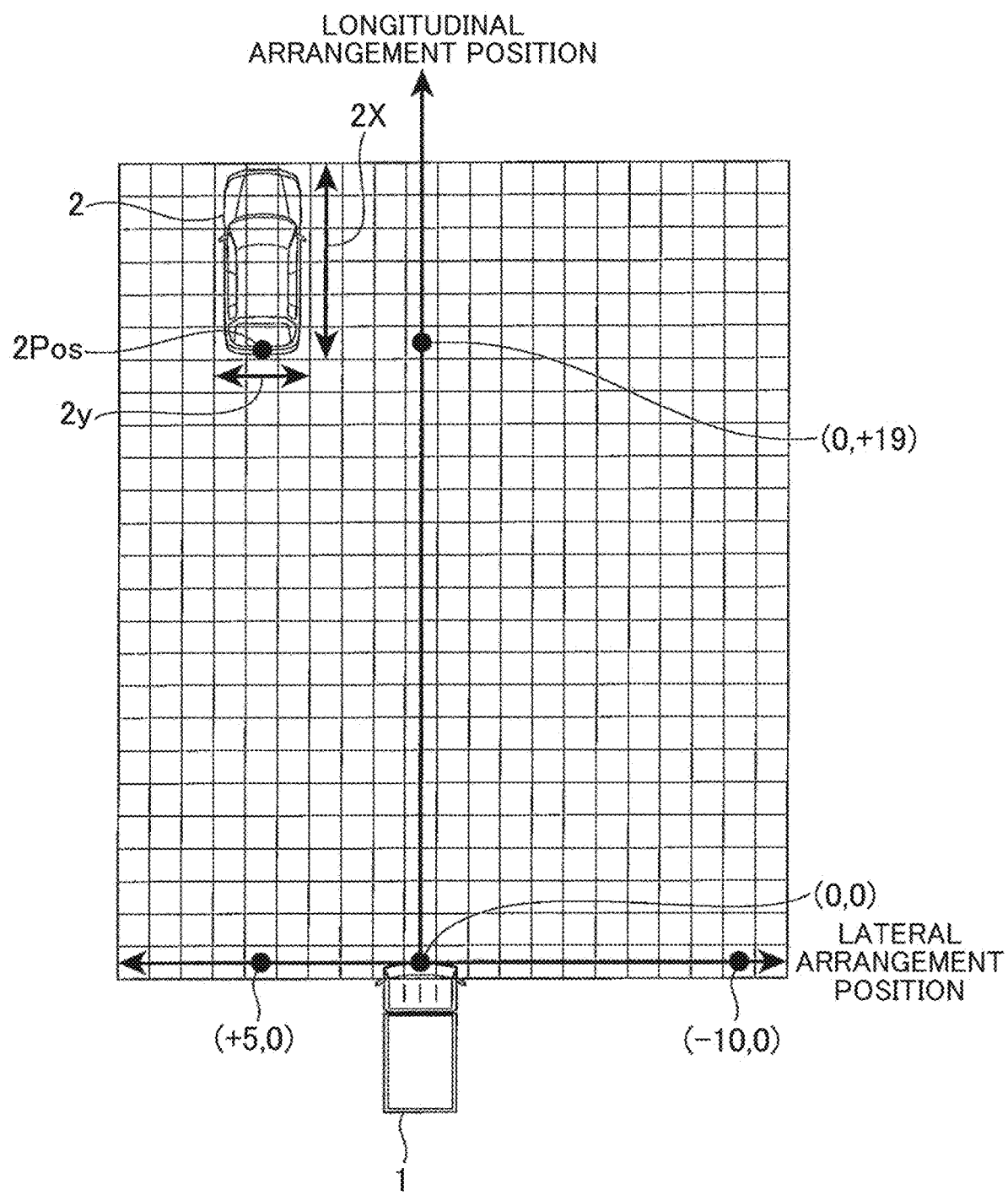
FIG. 10 is a view for describing the definition of the travelability determination array.

The travelability determination array used in the deceleration limit releasing calculation processing P400 is determined as arrangement information where the bird's eye view of the own vehicle 1 and the surrounding of the vehicle 1 shown in FIG. 10 is divided in two dimensionally in the longitudinal direction and the lateral direction. This two dimensional arrangement range is processed by a front area which corresponds to the inside of a range of the vehicle width of the own vehicle 1 and a right area and a left area outside the vehicle width of the own vehicle in a divided manner.

In the deceleration limit releasing calculation processing P400 performed by the deceleration limit releasing calculation unit 400, first, in processing P410, the position of the object ahead of the own vehicle front surface (in other words, in the depth direction with respect to the own vehicle 1) is searched from the travelability determination array. In processing P410, the front area of the travelability determination array is scanned in the frontward direction of the longitudinal arrangement position, that is, toward the positive direction from the position which is the arrangement position closest to the own vehicle 1 in the longitudinal arrangement positions, and the non-travelable arrangement position which is firstly found, that is, the longitudinal arrangement position which is the position closest to the own vehicle 1 in the longitudinal direction is acquired and such longitudinal arrangement position is acquired as the non-travelable longitudinal arrangement position. If a non-travelable area does not exist in the front area, the non-travelable longitudinal arrangement position is set to an invalid value, for example, a value which indicates the outside of the arrangement, and it is regarded that the non-travelable position has not existed.

Next, the processing advances to processing 420 where it is determined whether or not the non-travelable longitudinal arrangement position acquired in processing P410 is an invalid value. When the non-travelable longitudinal arrangement position is an invalid value, this means that an object does not exist ahead of the vehicle 1, that is, an emergency brake operation (an automatic brake operation) is unnecessary. Accordingly, the processing advances to processing P465 where limitless deceleration is set as limit deceleration and the processing is finished. In processing P420, when the non-travelable longitudinal arrangement position acquired in processing P410 is not an invalid value, that is, when the object exists ahead of the vehicle 1, the processing advances to processing P430.

Figure 14:
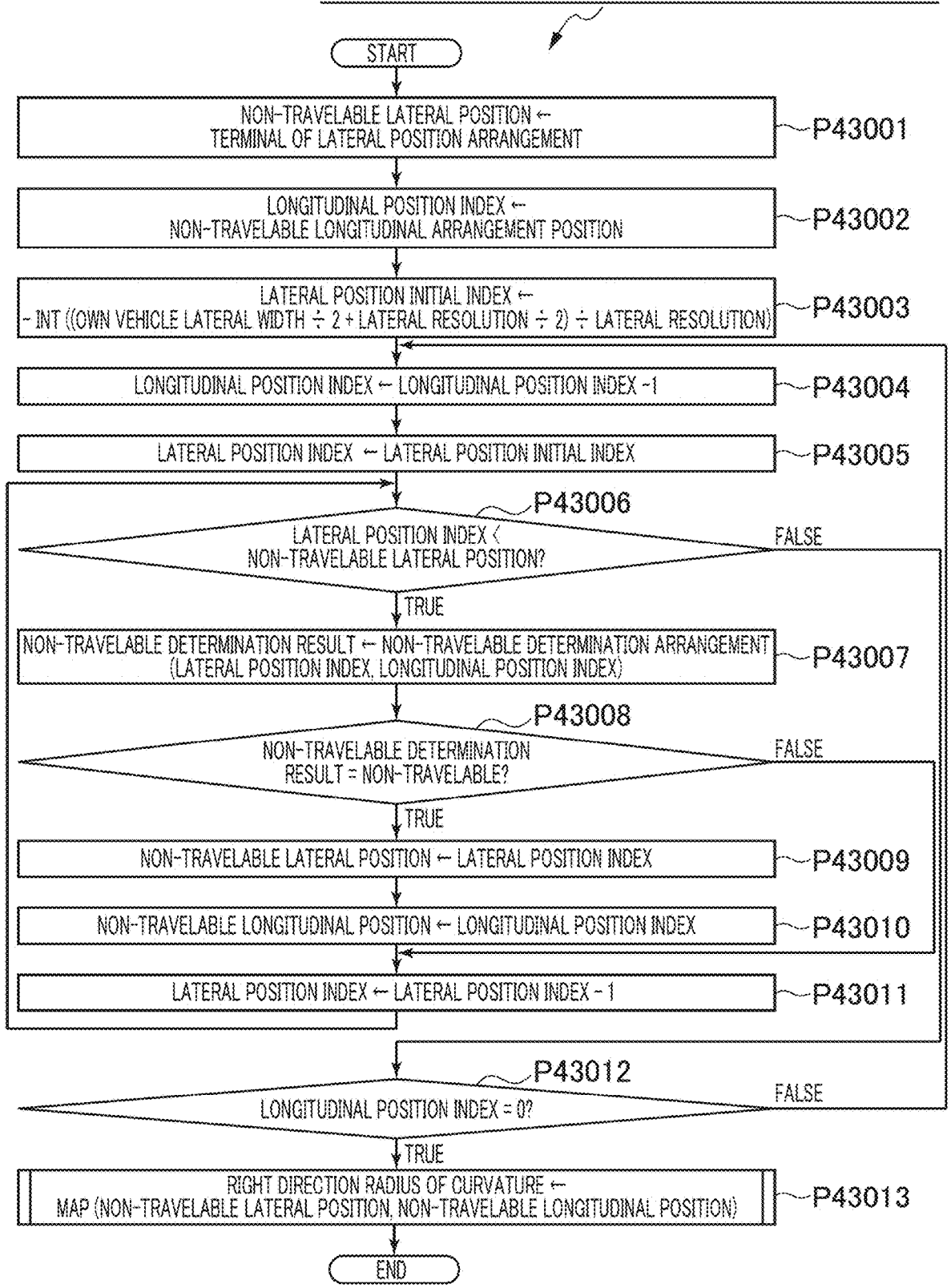
FIG. 14 is a flowchart showing right-direction radius-of-curvature acquisition processing.

In processing P430, the right area of the travelability determination array is searched, a degree of radius of curvature of a traveling route of the own vehicle 1 which allows the own vehicle 1 to travel or enter in the non-travelable position is detected, and such a radius of curvature is acquired as a right direction radius of curvature. Processing P430 is described with reference to FIG. 14.

In the right direction radius-of-curvature acquisition processing in processing P430, first, in processing P43001, a negative terminal position of the lateral position arrangement in the travelability determination array is set as a non-travelable lateral position. Next, in processing P43002, a longitudinal position index is initialized at non-travelable longitudinal arrangement position acquired in processing P410. Next, in processing P43003, a lateral position initial index is set. Since the lateral position initial index is repeatedly used in processing P43005 described later, the lateral position initial index is calculated in advance. The lateral position initial index is calculated by rounding up to the nearest integer by dividing a half of the own vehicle lateral width by a lateral resolution. This means that a left end of the right area of the travelability determination array is indicated.

Next, the processing advances to processing P43004 where a value acquired by decrementing the longitudinal position index by −1 is set as a new value of the longitudinal position index. Next, the processing advances to processing P43005 where a lateral position index is initialized by the lateral position initial index set in processing P43003. Next, the processing advances to determination P43006 where it is determined whether or not the lateral position index is smaller than the non-travelable lateral position. When the lateral position index is smaller than the non-travelable lateral position, the processing advances to processing P43007, while when the lateral position index becomes equal to or more than the non-travelable lateral position, the processing advances to determination P43012.

In processing P43007, from the non-travelability determination array, a result of travelability or non-travelability (non-travelability determination array) is acquired as a non-travelability determination result based on the lateral position index initialized in processing P43005 and the longitudinal position index acquired in processing P43004.

Next, it is determined whether or not the processing advances to determination P43008 where the non-travelable determination result acquired in processing P43007 is determined to be non-travelable. When the non-travelable determination result is non-travelable, the processing advances to P43009. On the other hand, when the non-travelable determination result is not non-travelable, that is, is travelable, processing P43009 and processing P43010 are not performed, and the processing advances to processing P43011. Processing P43009 is processing performed when the arrangement position which is non-travelable is detected. In processing P43009, non-travelable lateral position is set to the value of the lateral position index again. Succeeding to the above-mentioned processing, the processing advances to processing P43010 where the longitudinal position index is set to the non-travelable longitudinal position. Next, in processing P43011, a value acquired by decrementing the lateral position index by −1 is set as a new lateral position index, and the processing returns to determination P43006 and the processing is repeatedly performed.

By performing the determination and processing ranging from determination P43006 to processing P43011, the non-travelability determination array is scanned in the lateral direction. When "non-travelable" is detected, the non-travelable lateral position is updated in processing P43009, and the scanning is finished based on the determination in determination P43006. By adopting such a processing flow, unnecessary determination is not performed after the non-travelable position is detected at the closest arrangement in the lateral position.

Next, when it is determined that scanning in the lateral position direction is finished in determination P43006, and the processing advances to determination P43012, the determination is made whether or not the longitudinal position index becomes equal to 0, that is, the longitudinal direction position from the own vehicle 1 becomes the closest position. When the longitudinal position index is equal to 0, it is estimated that scanning in the longitudinal direction is also finished, and the processing advances to P43013. When the longitudinal position index is not equal to 0, to continue scanning in the longitudinal direction, the processing returns to processing P43004. When the processing returns from the determination P43012 to processing P43004, the longitudinal position index is updated in the direction that the object approaches the own vehicle 1. Then, the processing from processing P43005 to processing P43011 is repeatedly performed so as to continue scanning in the longitudinal direction.

Next, in processing P43013, a parameter having a radius of curvature defined by a two dimensional arrangement form in advance is acquired based on a non-travelable lateral position, and a non-travelable longitudinal position, and is set as a right-direction radius of curvature. With respect to the parameter of the radius of curvature, radii of curvature of a traveling route of the own vehicle 1 which allow traveling of the own vehicle 1 at respective arrangement positions are calculated in advance, and are set in a ROM.

When the right-direction radius of curvature is set in processing P430 in this manner, the processing advances to processing P431 (FIG. 13), and a right-direction yaw rate is calculated based on the right-direction radius of curvature and a speed of the own vehicle 1 using the following formula (5).

$$\text{yaw rate} = \text{speed} \div \text{radius of curvature} \quad (5)$$

Next, the processing advances to processing P432 where a right limit deceleration (also referred to as a right deceleration limit value) is acquired from weight distribution information acquired in deflection estimation processing P200, that is, from a left wheel weight and a right wheel weight, and the right-direction yaw rate acquired in processing P431. With respect to the deceleration of the own vehicle 1, a brake manipulation is performed such that fixed deceleration is acquired by an experiment in a state where the weight distribution with respect to the own vehicle 1 is changed, and degrees of generated yaw rates are set as parameters in the form of map values, and the parameters are incorporated in the ROM. Then, deceleration of the own vehicle 1 is acquired based on the combination of the yaw rate and the weight distribution by looking up the map values, and the deceleration is set as a right deceleration limit value. That is, it is understood that, even when deceleration equal to the right deceleration limit value acquired by such a result occurs in the own vehicle 1, there is no possibility that the own vehicle 1 enters a non-travelable area in the right area (specifically, it is possible to suppress the occurrence of deflection of the vehicle 1 by which the vehicle 1 enters a non-travelable area which is not determined to be travelable based on a travelability determination result acquired by the travelability determination unit 300) and hence, the own vehicle 1 does not collide with an obstacle or does not fall from a cliff or fall into a groove.

Figure 15:
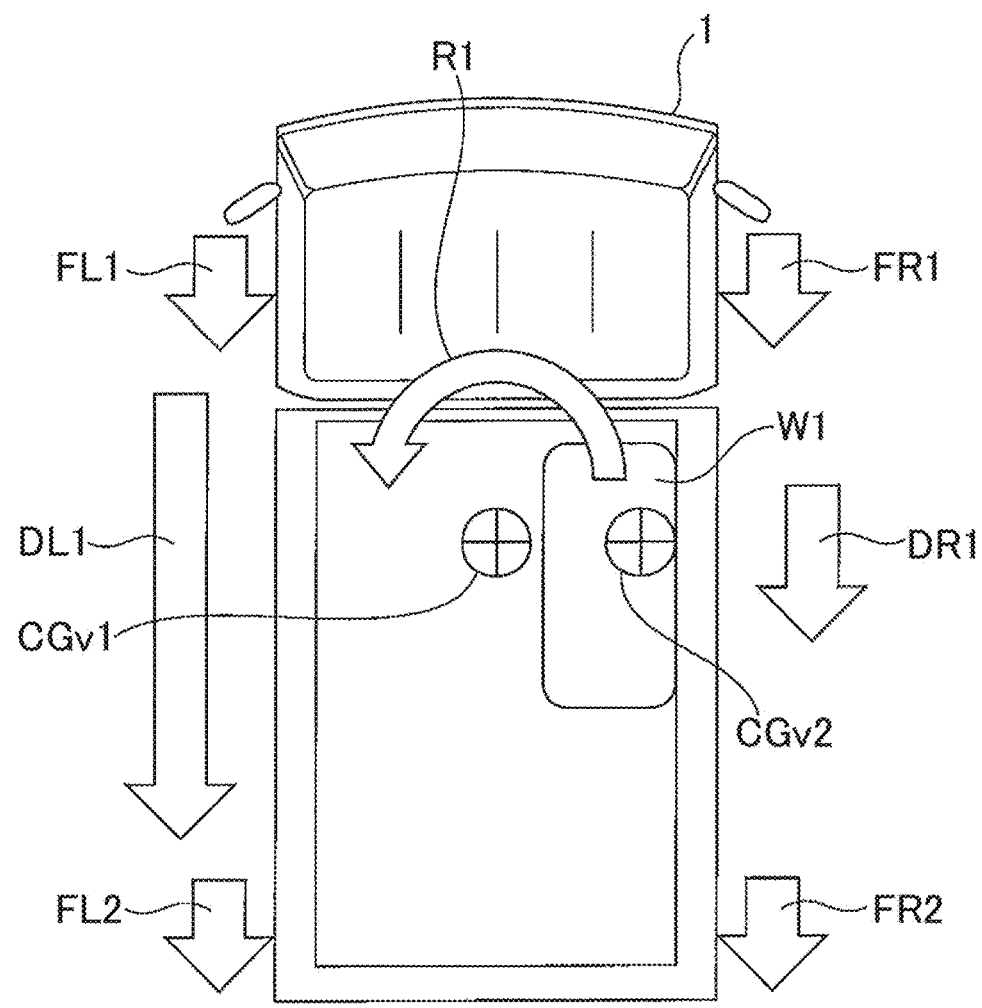
FIG. 15 is a bird's eye view for describing the generation of a turning force applied to a vehicle.

One example of the behavior of the vehicle in such a state is described with reference to FIG. 15. FIG. 15 is a bird's eye view for describing the generation of a turning force applied to the vehicle 1. In the illustrated example, the vehicle 1 has a vehicle weight of 1000 [kg], and a load W1 having a weight of 300 [kg] is loaded on a right side of the vehicle 1. The position of the center of gravity of the vehicle 1 including the load W1 moves from the center of gravity CGv1 when the load W1 is not included to the center of gravity CGv2 on the right side. When a braking control is performed in such a situation, a brake force is uniformly generated on the left and right wheels. Symbol FR1 indicates a brake force applied to the right front wheel, symbol FL1 indicates a brake force applied to the left front wheel, symbol FR2 indicates a brake force applied to the right rear wheel, and symbol FL2 indicates a brake force applied to the left rear wheel. FR1 and FL1 are equal and the same brake force is applied as FR2 and FL2. Accordingly, when the center of gravity is positioned at CGv1, the weight decelerated at the right wheel and the weight decelerated at the left wheel become equal, and a deceleration force DR1 which is generated on the right wheel and a deceleration force DL1 which is generated on the left wheel become equal. Accordingly, the vehicle 1 does not turn. However, in such a state, the center of gravity is at CGv2 and hence, the weight decelerated at the right wheel is large, and DR1 becomes small. On the other hand, the weight decelerated at the left wheel is small, and DL1 becomes large. As a result, in the own vehicle 1, a turning force in a counterclockwise direction indicated by R1 is generated and hence, a deflection force in the left direction is generated on the vehicle 1. Further, when the deceleration force is large, that is, FR1, FR2, FL1 and FL2 are large, magnitudes of DR1 and DL1 are proportionally increased, and the difference between DR1 and DL1 is proportionally increased and hence, a larger turning force is generated.

Accordingly, the deceleration (the right limit deceleration) acquired from the combination of the yaw rate and the weight distribution described above is set to smaller deceleration when an absolute value of the yaw rate (corresponding to the position of the non-travelable area) is small, and the larger deceleration is induced when the absolute value of the yaw rate is large. Further, in a case where the weight distribution (corresponding to a deflection amount of the vehicle 1) is largely offset in the lateral direction, the smaller deceleration is induced. Further, deceleration is set such that, when an amount of deviation (deviation amount) of the weight distribution in the lateral direction is small, the larger deceleration is induced.

In this case, a parameter of the deceleration limit value (right limit deceleration, right deceleration limit value) is set such that the deceleration has a value only when the weight distribution is offset to a right side, and the deviation of the weight distribution to the left side does not affect the non-travelable area existing on the right area.

Next, the processing advances to processing P440. In processing P440, in the same manner as processing P430, non-travelability determination array is scanned with respect to the left direction (left area this time, and a left-direction radius of curvature is acquired. Further, in processing P441, in the same manner as processing P431, a left-direction yaw rate is calculated, and in processing P442, in the same manner as processing P432, left limit deceleration (also referred to as a left deceleration limit value) is acquired.

Next, the processing advances to determination P450 where the right limit deceleration acquired in processing P432 and the left limit deceleration acquired in processing P442 are compared with each other. When the left limit deceleration is small, that is, the left limit deceleration has a value which limits the deceleration of the vehicle 1 more strongly, the processing advances to processing P461, and the left limit deceleration is set to the limit deceleration of the vehicle 1. On the other hand, when the right limit deceleration is equal to or smaller than the left limit deceleration, the processing advances to processing P462, and the right limit deceleration is set to the limit deceleration of the vehicle 1. Accordingly, the deceleration which the own vehicle 1 can output is decided eventually, and the deceleration limit releasing calculation processing P400 is finished.

The deceleration limit releasing calculation processing P400 repeatedly performs the determination at a short cycle. When an obstacle ahead of the own vehicle and the own vehicle 1 approach each other, along with a lapse of time, the position of the map looked up in processing P432 and processing P4442 exhibits a value close to the own vehicle 1. The closer the obstacle ahead of the vehicle and the vehicle 1 approach to each other, the larger value the limit deceleration takes. Even when an obstacle exists on a right area or on a left area, the closer the obstacle and the own vehicle 1 approach to each other, the stronger a deceleration control to be performed becomes and the remoter the obstacle and the own vehicle 1 are away from each other, the weaker the deceleration control becomes.

In this embodiment, in a case where it is determined that an object exists ahead of the vehicle 1 (P420) by taking into account left side traveling (the vehicle 1 traveling on a left side lane) as in the case of Japan, a search is made from a right area of the travelability determination array. However, it is needless to say that the search is made from the left area of the travelability determination array.

(Emergency Brake Operation Determination Processing P500)

Figure 16:
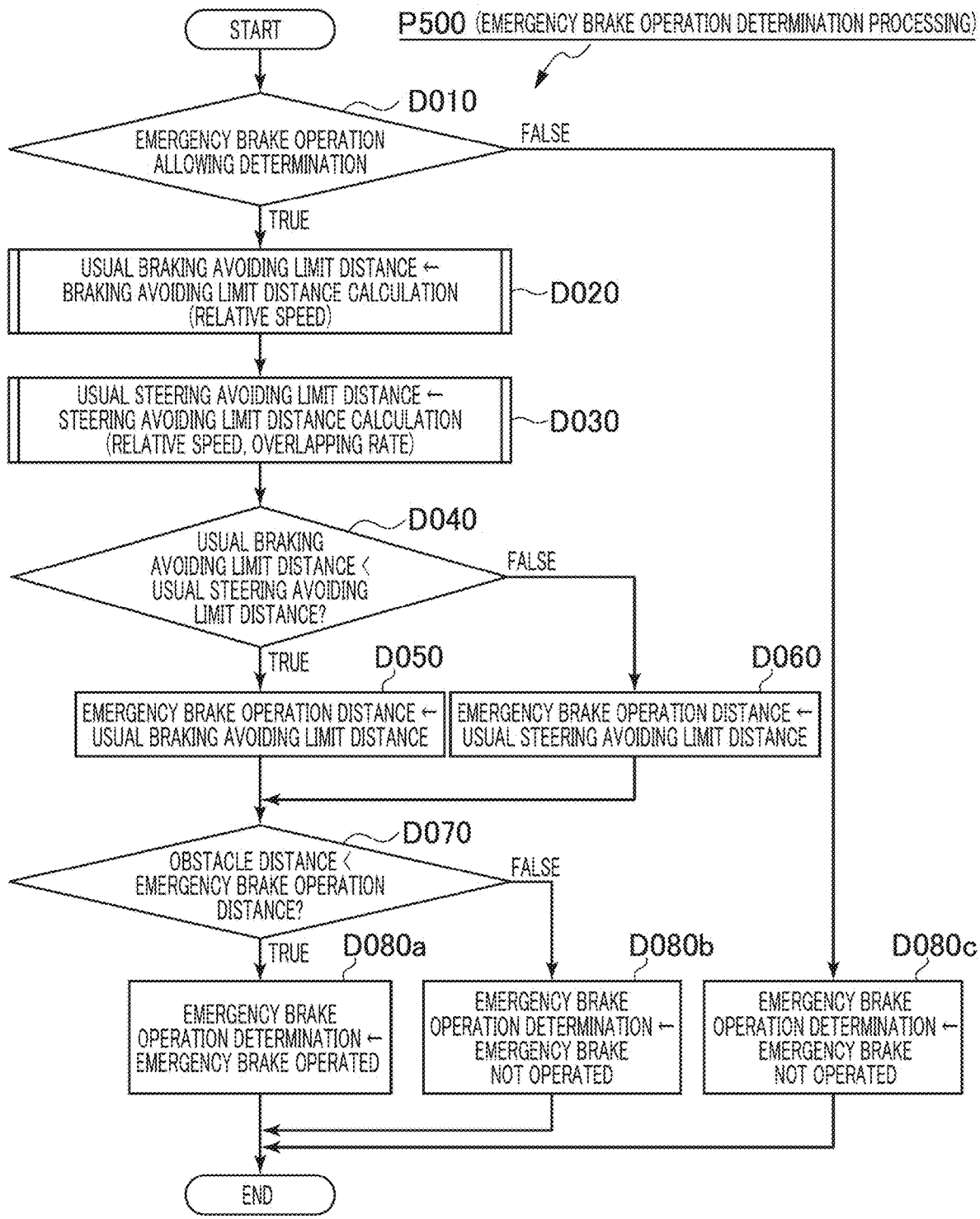
FIG. 16 is a flowchart showing emergency brake operation determination processing.

Next, emergency brake operation determination processing P500 is described with reference to FIG. 16.

In the emergency brake operation determination processing P500 performed by the emergency brake operation determination unit 500, first, in determination D010, it is determined whether a state of the own vehicle 1 and a result of recognizing the surrounding of the own vehicle 1 are in a situation suitable for performing an operation of an emergency brake. For example, when any one of conditions enumerated below is satisfied, the situation is determined to be not suitable as a condition which allows an operation of the emergency brake.

A failure is detected in any one of a sensor, an actuator and a control unit of the own vehicle 1.

Noises are generated in received data of the vehicle control device 100 and the vehicle control device 100 fails to receive data.

The own vehicle 1 is being stopped.

A gear position is set in a reverse range or in a parking range.

A sudden acceleration manipulation of a driver is detected.

A sudden steering manipulation of a driver is detected.

A steering amount of a driver is set to a fixed value or more.

A yaw rate absolute value of the own vehicle 1 is set to a fixed value or more.

A stability control is being operated by an electronic stability control device.

A detected obstacle is classified into an object such as weeds which minimally affect the own vehicle 1 even when the own vehicle 1 collides with the obstacle.

A detected obstacle does not exist on a traveling route of the own vehicle 1.

When it is determined that a situation is not suitable as a condition which allows an operation of an emergency brake, it is determined that the emergency brake operation allowing determination is not established, and the processing advances to processing D080c. The braking operation determination is set to the emergency brake non-operation, and emergency brake operation determination processing P500 is finished.

When it is not determined that a situation is not suitable as a condition which allows an operation of an emergency brake, it is determined that the emergency brake operation allowing determination is established, and the processing advances to processing D020. In processing D020, a usual braking avoiding limit distance is acquired based on a relative speed between the own vehicle 1 and an obstacle. The usual braking avoiding limit distance indicates a limit distance which can avoid collision by a usual braking manipulation of a driver, and is acquired by the following formula (6), for example.

$$\text{usual braking avoiding limit distance} = (0.0167 \times \text{relative speed} + 1.00) \times \text{relative speed} \quad (6)$$

Next, processing advances to processing D030 where a usual steering avoiding limit distance is acquired from a relative speed between the own vehicle 1 and an obstacle and an overlapping ratio. The overlapping ratio used here indicates a ratio which an obstacle occupies with respect to an advancing route of the own vehicle 1. The overlapping ratio is calculated corresponding to a lateral position and a lateral width of the obstacle, a width of the own vehicle 1, and a steering situation, and is acquired by the stereoscopic camera 20. The usual steering avoiding limit distance calculated in processing D030 indicates a distance of a limit which can avoid a collision by a usual steering manipulation by a driver, and is acquired by the following formula (7)

$$\text{usual steering avoiding limit distance} = (0.0067 \times \text{overlapping ratio} + 1.13) \times \text{relative speed} \quad (7)$$

Next, the processing advances to determination D040 where usual braking avoiding limit distance acquired in processing D020 and usual steering avoiding limit distance acquired in processing D030 are compared to each other. When the usual braking avoiding limit distance is smaller than the usual steering avoiding limit distance, the processing advances to processing D050, and sets the usual braking avoiding limit distance as an emergency brake operation distance.

When the usual steering avoiding limit distance is equal to or smaller than the usual braking avoiding limit distance as the result of determination D040, the processing advances to processing D060, and the usual steering avoiding limit distance is set as the emergency brake operation distance.

The emergency brake operation distance acquired in this manner is set such that a driver feels that a physical collision cannot be avoided so as not to bring about a situation where the driver overestimates collision damage alleviation brake.

After the emergency brake operation distance is acquired in processing D050 or D060, the processing advances to determination D070 where a distance between an obstacle and the own vehicle 1 (obstacle distance) and the emergency brake operation distance are compared to each other. When the distance between an obstacle and the own vehicle 1 (obstacle distance) is smaller, that is, when the distance between the obstacle and the own vehicle 1 (obstacle distance) becomes smaller than a distance for operating a brake, the processing advances to processing D080$a$ where an emergency brake operation is set in the emergency brake operation determination. As a result of determination D070, when the distance between the obstacle and the own vehicle 1 (obstacle distance) becomes equal to or more than the emergency brake operation distance, that is, when the distance between the obstacle and the own vehicle 1 (obstacle distance) becomes larger than a distance necessary for operating the brake, the processing advances to processing D080$b$. In the same manner as processing D080$c$, an emergency brake non-operation is set in the emergency brake operation determination, and emergency brake operation determination processing P500 is finished.

In performing determination D070, when an emergency brake operation has been already started, an emergency brake operation distance used in the determination is treated as a value which is acquired by adding an offset value of +5 [m] to the emergency brake operation distance. With such processing, it is possible to prevent the occurrence of a case where an obstacle distance is changed to a long value by a sensing error immediately after an emergency brake operation so that the brake operation determination momentarily determines that the emergency brake is not operable and, immediately after the determination, the non-brake operation is changed to an emergency brake operation.

By performing the emergency brake operation determination processing P500 in this manner, the determination can be made such that an emergency brake is operable only within a short distance which prevents a driver from overestimating the collision damage alleviation brake.

(Emergency Brake Deceleration Calculation Processing P600)

Next, emergency brake deceleration calculation processing P600 performed by an emergency brake deceleration calculation unit 600 is described with reference to FIG. 17.

In emergency brake deceleration calculation processing P600 performed by the emergency brake deceleration calculation unit 600, first, in determination G010, the emergency brake operation determination acquired in emergency brake operation determination processing P500 described above is checked, and it is determined whether or not an emergency brake operation is established. When the emergency brake operation is not established, the processing advances to processing G060 where emergency brake deceleration is set to 0 [m/s$^2$] and emergency brake deceleration calculation processing P600 is finished. Here, setting the emergency brake deceleration to 0 [m/s$^2$] means that an emergency brake (automatic brake) is not performed so that an operation of the brake attributed to the vehicle control device 100 is not performed.

Next, when the emergency brake operation is established in determination G010, the processing advances to processing G020 where a deceleration basic value (including a deceleration start timing basic value) is calculated. In processing G020, the deceleration basic value is calculated using the following formula (8), for example, based on a relative speed between the own vehicle 1 and an obstacle and an object distance.

deceleration basic value=(relative speed)$^2$/2×(obstacle distance−0.5)

Here, 0.5 subtracted from the obstacle distance expresses a distance between the own vehicle 1 and the obstacle when a collision is avoided by finishing the emergency brake deceleration. In the result of the formula (8), the obstacle distance becomes 0.5 [m] at the time of avoiding the collision. The result of the formular (8) is largely influenced by a measurement error of an obstacle distance, and when an original value of 0.6 [m] becomes 0.5 [m], the division by zero is brought about. Accordingly, the calculation result of the formula (8) is recorded in the ROM in advance as a two-dimensional parameter using a relative speed and an obstacle distance as axes. Further, a parameter having axes which cannot be calculated such as a case where obstacle distance is 0.5 [m] or less, by setting the maximum deceleration which the vehicle can output as a parameter, it is possible to prevent the occurrence of a problem that the division by zero is brought about or the negative deceleration is calculated. At the time of performing processing G020, a deceleration basic value is acquired by looking up a parameter set in the ROM.

Next, the processing advances to determination G030 where the deceleration basic value acquired in processing G020 and the limit deceleration acquired in the deceleration limit releasing calculation processing P400 are compared with each other. When the deceleration basic value is larger than the limit deceleration, that is, when deceleration corresponding to the deceleration basic value is generated on the vehicle 1 so that the vehicle 1 is deflected by a yaw moment generated on the vehicle 1 whereby the vehicle 1 enters a non-travelable area, the processing advances to processing G040 where the limit deceleration is set to the emergency brake deceleration so that the deceleration is set to a value which prevents the vehicle 1 from entering the non-travelable area (specifically, a value which suppresses the generation of deflection of the vehicle 1 which makes the vehicle 1 enter the non-travelable area which is not determined to be travelable by the travelability determination result acquired by the travelability determination unit 300), and the emergency brake deceleration calculation processing P600 is finished.

Further, when the deceleration basic value becomes the limit deceleration or less as a result of determination G030, even when the deceleration corresponding to the deceleration basic value is generated on the vehicle 1, there is no possibility that the vehicle 1 enters the non-travelable area. Accordingly, the processing advances to processing G050 where the deceleration basic value is set as the emergency brake deceleration, that is, the deceleration which maximizes the avoidance and the reduction of collision damage to an obstacle ahead of the own vehicle, and emergency brake deceleration calculation processing P600 is finished.

The limit deceleration used in the emergency brake deceleration calculation processing P600 may take a value which is not accompanied by the deceleration of the vehicle 1 when a non-travelable area which is remote from the own vehicle 1 in the longitudinal direction and is close to the own vehicle 1 in the lateral direction exists. In this case, a braking control is not performed with respect to the vehicle 1, and braking (deceleration) start timing may be delayed compared to braking (deceleration) timing when the limit deceleration is large. By delaying the start timing of the braking, a distance that the own vehicle 1 travels in a situation where the deflection of the own vehicle 1 occurs can be shortened and hence, the manner of operation and advantageous effects substantially equal to the above-mentioned manner of operation and advantageous effects can be acquired.

(Collision Warning Determination Processing P700)

Next, the collision warning determination processing P700 is described with reference to FIG. 18.

In the collision warning determination processing P700 performed by a collision warning determination unit 700, first, determination K010, the collision warning determination unit 700 determines whether a state of the own vehicle 1 and a result acquired by recognizing the surrounding of the own vehicle 1 are in a situation suitable for an operation of collision warning. For example, when any one of conditions enumerated below is established, the collision warning determination unit 700 determines that the situation is not a situation suitable as a condition which allows a collision warning operation.

A failure is detected in any one of a sensor, an actuator and a control unit of the own vehicle 1.

Noises are generated in received data of the vehicle control device 100 and the vehicle control device 100 fails to receive data.

The own vehicle 1 is being stopped.

A gear position is set in a reverse range or in a parking range.

A sudden acceleration manipulation of a driver is detected.

A sudden brake manipulation of the driver is detected.

A brake manipulation pressure of a driver becomes a fixed value or more.

A sudden steering manipulation of a driver is detected.

A steering amount of a driver is set to a fixed value or more.

A yaw rate absolute value of the own vehicle 1 is set to a fixed value or more.

A stability control is being operated by an electronic stability control device.

A detected obstacle is classified into an object such as weeds which minimally affect the own vehicle 1 even when the own vehicle 1 collides with the obstacle.

A detected obstacle exists at a position 1 m or more away from a traveling route of the own vehicle 1.

When the collision warning determination unit 700 determines that the situation is not suitable as a condition which allows an operation of collision warning, it is determined that the collision warning operation allowing determination is not established, and the processing advances to processing K060 where a collision warning determination result is set as warning non-operable and the collision warning determination processing P700 is finished.

When the collision warning determination unit 700 does not determine that the situation is not suitable for a condition which allows an operation of collision warning, it is determined that the collision warning operation allowing determination is established, and the processing advances to processing K020. In processing K020, a warning operation distance is acquired from a relative speed between the own vehicle 1 and the obstacle and an overlapping ratio. The warning operation distance sets a value acquired by adding a warning addition distance acquired by the following formula (9) to the emergency brake operation distance acquired in the emergency brake operation determination processing P500 described above as a parameter, and stores the value in the ROM.

Warning addition distance=relative speed×0.8   (9)

In the above formula (9), 0.8 used in the processing is a response time necessary for notification to a driver, and is set such that warning is given to the driver by 0.8 s before the processing is shifted to an emergency brake operation. When the number of users of the own vehicles 1 such as aged people who require a longer reaction time is increased, there may be a case where the constant of 0.8[s] is prolonged to 1.2[s]. That is, tuning is necessary in conformity with the vehicle.

The parameter set in the ROM in this manner is placed as the two-dimensional parameter which uses the relative speed and the overlapping ratio as axes, and a warning operation distance is acquired by looking up the parameter in combination with the relative speed and the overlapping ratio when the calculation is performed in processing K020.

Next, the processing advances to determination K030 where a distance between the own vehicle 1 and an obstacle (obstacle distance) and the warning operation distance acquired in processing K020 are compared with each other. When the obstacle distance is smaller than the warning operation distance, that is, when the current distance is short as a result of the determination, the processing advances to processing K040 where a warning operation is set as a collision warning determination result, and the collision warning determination processing P700 is finished. On the other hand, when the distance between the own vehicle 1 and the obstacle is equal to or larger than the warning operation distance as the result of the determination, the distance between the own vehicle 1 and the obstacle is remote so that it is determined that warning is unnecessary and the processing advances to processing K050. "non-warning" is set as the result of collision warning determination result in the same manner as the processing K060, and the collision warning determination processing P700 is finished.

In performing the determination K030, in a situation where a warning operation is already set in the collision warning determination result, the warning operation distance is treated as the warning operation distance +5[m]. With such treatment, it is possible to prevent the occurrence of a phenomenon where when noises generated by a measurement error are generated with respect to the distance between the own vehicle 1 and the obstacle and a relative speed and an overlapping ratio used in the calculation in processing K020, warning becomes temporarily inoperable in a collision warning determination result and, thereafter, a warning operation is restored immediately as the noises disappear.

(Communication Data Output Processing P120)

Communication data output processing P120 which is a final processing is described.

In communication data output processing P120 performed by a communication data output unit 120, based on a result acquired by the processing from processing P200 to P700, the conversion into communication data, and data transmission to the brake control unit 30 and the meter control unit 70 are performed. In the conversion of communication data, emergency brake deceleration acquired in processing P600 and a collision warning determination result acquired in processing P700 are converted in accordance with standard relating to a communication path. For example, emergency brake deceleration calculated in accordance with a floating number type is converted into 16 [bit]. Alternatively, a collision warning determination result is transmitted by converting the collision warning determination result into digital values by allocating values such that 1 is allocated to the result during a warning operation and 0 is allocated to the result during a non-warning operation.

Further, to prevent the occurrence of noises on a communication path and the erroneous transmission of excessively large emergency brake deceleration, cyclic redundancy check (CRC), parity or checksum is given to respective data as communication data.

Then, by transmitting emergency brake deceleration which is converted for communication to the brake control unit 30 and by transmitting a collision warning determination result to the meter control unit 70, the reduction and avoidance of a collision damage by a brake control of the vehicle 1, and the enhancement of the reduction and avoidance of collision damage by notification to a driver can be realized.

As has been described above, the vehicle control device 100 according to this embodiment includes: the travelability determination unit 300 which determines whether or not the vehicle 1 is travelable in an area disposed ahead of the vehicle 1 on left and right sides of the vehicle 1; the deflection estimation unit 200 which estimates deflection of the vehicle 1 due to generation of a brake force applied to the vehicle 1; and the braking control unit 800 which calculates deceleration and deceleration start timing based on the distance between the vehicle 1 and an obstacle ahead of the vehicle 1 and a relative speed of the vehicle to the obstacle, and changes at least one of the deceleration and the deceleration start timing based on a travelability determination result acquired from the travelability determination unit 300 and a deflection estimation result acquired from the deflection estimation unit 200.

Further, the braking control unit 800, by changing at least one of the above-mentioned deceleration and the deceleration control start timing, suppresses the occurrence of the deflection of the vehicle 1 which leads to the entry of the vehicle 1 into the non-travelable area which is not determined to be travelable by the travelability determination result acquired from the travelability determination unit 300.

To describe in detail, the braking control unit 800 includes: the deceleration limit releasing calculation unit 400 which calculates limit deceleration for suppressing the occurrence of the deflection of the vehicle 1 which leads to the entry of the vehicle 1 into the non-travelable area which is not determined to be travelable by the travelability determination result acquired from the travelability determination unit 300 based on the travelability determination result acquired from the travelability determination unit 300 and the deflection estimation result acquired from the deflection estimation unit 200; and the emergency brake deceleration calculation unit 600 which calculates the deceleration basic value based on the distance between the vehicle 1 and the obstacle ahead of the vehicle 1 and the relative speed, and sets either one of the deceleration basic value and the limit deceleration which takes a smaller value as the deceleration used in a deceleration control of the vehicle 1.

That is, the vehicle control device 100 according to this embodiment estimates a change in an advancing direction (deflection) of the own vehicle 1 based on a loaded situation or the like of the own vehicle 1, detects the presence or the absence of an object which induces collision damage as a result of the deflection, and performs braking with a strong deceleration force (a limit on the deceleration force being released) which allows the generation of the change in the advancing direction when the object which induces the collision damage does not exists. On the other hand, when the object which induces the collision damage exists, braking is performed with a weak deceleration force which suppress the occurrence of a change in an advancing direction (the limit on the deceleration force being added).

With such processing, according to this embodiment, even in a scene where the advancing direction of the own vehicle 1 (for example, a vehicle whose center of gravity largely changes laterally due to load) is changed by an operation of the automatic brake (the emergency brake) with respect to the vehicle 1, when an object which induces collision damage does not exist, the reduction of collision damage and a collision avoiding performance can be enhanced by using a strong brake (in other words, by releasing a limit on the deceleration generated by the emergency brake).

Hereinafter, modifications of the above-mentioned embodiment are described.

<Modification 1>

Deflection estimation processing P200 performed by the deflection estimation unit 200 can be modified as follows <<Modification 1-1>>

In processing P240 in the above-mentioned embodiment (see FIG. 4), the lateral offset of the center of gravity of the own vehicle (in other words, a load weight being offset to the position on either the left side or the right side of the vehicle 1) is estimated using a roll angle of the own vehicle 1 acquired from the stereoscopic camera 20 (an image imaged by the stereoscopic camera 20). However, a plurality of weight sensors are mounted on (the left side and the right side of) the vehicle it is measured at which rate the center of gravity is offset to a left side or a right side of the vehicle 1 based on a weight applied to a weight sensor, and a left wheel weight and a right wheel weight (a loaded state of the vehicle 1) can be acquired based on the weight applied to the weight sensor. In this case, since it is necessary to mount the weight sensor, a cost necessary for manufacturing the vehicle 1 is increased and the restriction is imposed on a design of the vehicle 1 by an amount corresponding to mounting of the weight sensors. However, this modification has an advantage that an offset of the weight of the vehicle 1 can be measured with high accuracy.

<<Modification 1-2>>

In processing P240 in the above-mentioned embodiment (see FIG. 4), the lateral offset of the center of gravity of the own vehicle 1 (in other words, a load weight being offset to the position on either the left side or the right side of the vehicle 1) is estimated using a roll angle of the own vehicle 1 acquired from the stereoscopic camera 20 (an image imaged by the stereoscopic camera 20). However, in processing P240, a yaw rate which is estimated from a steering angle and an own vehicle speed and a value of the yaw rate sensor are compared to each other during acceleration or deceleration of the own vehicle 1. In processing P250, it is possible that a load weight (a loaded state of the vehicle 1) is estimated from a difference between the estimated yaw rate and the yaw rate sensor value.

When a load is loaded on the own vehicle 1 in an offset manner either in a left direction or in a right direction, the vehicle 1 takes a straight advancing state in a state where a steering angle is slightly bent in a loading direction in an offset manner during acceleration or deceleration of the own vehicle 1. At this stage, the yaw rate sensor value is held at 0[deg/s]. Accordingly, the weight difference between the left side and the right side can be estimated from the difference. In a case where this method is used, it is possible to acquire an advantageous effect that, even in a traveling environment which is dark so that the estimation of a roll angle of the own vehicle is difficult by the stereoscopic camera 20, a left and right weight ratio of the own vehicle 1 can be acquired.

<<Modification 1-3>>

In processing P240 in the above-mentioned embodiment (see FIG. 4), the lateral offset of the center of gravity of the own vehicle (in other words, a load weight being offset to the position on either the left side or the right side of the vehicle 1) is estimated, using a roll angle of the own vehicle 1 acquired from the stereoscopic camera (an image imaged by the stereoscopic camera 20). However, the roll angle of the own vehicle 1 can be acquired by also monitoring a value of a lateral acceleration sensor during straightforward traveling or during parking. This modification makes use of an action where, in a case where the own vehicle 1 is tilted to either the left side or the right side by a load, even when lateral acceleration is not generated on the own vehicle 1, the lateral acceleration changes due to the center of gravity, and the lateral acceleration is increased in proportion to a tilting angle of the own vehicle 1. By adopting such a method, it is possible to acquire an advantageous effect that, in the same manner as the modification 1-2 described above, even in a traveling environment where it is dark so that the estimation of an own vehicle roll angle using the stereoscopic camera 20 is difficult, a left and right weight ratio of the own vehicle 1 can be acquired.

<<Modification 1-4>>

In the embodiment, the modification 1-1, the modification 1-2 and the modification 1-3 described above, the methods which measure tilting of the own vehicle 1 and the offsetting of load independently by the respective sensors are described. However, by combining some or all of these techniques, the estimation of the load weight can be performed with redundancy and hence, erroneous estimation can be suppressed.

<<Modification 1-5>>

In the above-mentioned embodiment, the weight distribution between the left wheel and the right wheel is estimated. However, there is a method which finds the presence or the absence of the occurrence of offsetting of the own vehicle 1 using the load weight acquired in processing P230 (FIG. 4). Specifically, for example, assuming that the load weight is 500 [kg], an experiment where an emergency brake is performed is carried out with respect to a case where 500 [kg] is loaded on the right end of the own vehicle in an offset manner, and with respect to a case where 500 [kg] is loaded on the left end of the own vehicle in an offset manner. The result of the experiment is used in the maps of processing P432 and processing P442 (FIG. 13) as a maximum offset amount when the staked weight is 500 [kg]. In this case, there is a disadvantage that, even when loading of 500 [kg] is performed without offsetting, limit deceleration becomes small in the same manner as the case where loading of 500 [kg] is performed on the right end of the own vehicle in an offset manner and a case where loading of 500 [kg] is performed on the left end of the own vehicle in an offset manner. However, in a case where it is difficult to estimate which side the center of gravity of the own vehicle is offset between the left side and the right side, for example, in a case of a route bus where the movement of the center of gravity during traveling is expected in running the route bus or a case of a vehicle which is used for transporting cattle when there is no obstacle ahead of the own vehicle on a left side and right side of the vehicle, strong deceleration can be applied in the same manner as usual loading.

<Modification 2>

The following modification can be also performed with respect to travelability determination processing P300 by the travelability determination unit 300.

<<Modification 2-1>>

In the above-mentioned embodiment, the technique is adopted where travelability determination array is build up by processing P350 (FIG. 11) using information of the stereoscopic camera 20. However, a technique for acquiring information on the surrounding of the own vehicle is not limited to the stereoscopic camera 20. For example, in monitoring an area behind the own vehicle, a moving speed of a pedestrian differs from a moving speed of the own vehicle 1 in the frontward direction and hence, it is unnecessary to monitor the pedestrian. Further, a light source such as a front lamp does not exist with respect to the area behind the own vehicle 1 and hence, accuracy of the stereoscopic camera 20 at night is lowered. Accordingly, the stereoscopic camera 20 is not good at the detection of the pedestrian or the like. However, by monitoring the area behind the own vehicle using a millimeter wave radar which minimally decreases detection accuracy even in bad weather and at night, an object which is arranged in the travelability determination array can be detected.

The stereoscopic camera and the millimeter wave radar can be used in combination. For example, with respect to the approaching of an oncoming vehicle, by detecting a pedestrian ahead of the own vehicle by the stereoscopic camera while detecting a distance and a speed using the millimeter wave radar, and by arranging detected values on the travelability determination array, an area in which the own vehicle 1 is travelable can be accurately discriminated. Further, by using a plurality of sensing simultaneously, sensing can be performed with redundancy and hence, it is possible to acquire information with high accuracy.

<<Modification 2-2>>

In the above-mentioned embodiment and the modification 2-1, the method in which the sensor which monitors an environment of the surrounding of the own vehicle (the vehicle external field recognition sensor) is mounted on the own vehicle 1 is adopted. However, a sensor which monitors a pedestrian, a vehicle and the like (a vehicle external world recognition sensor) is mounted on a road and equipment on the surrounding of the road such as a traffic signal, and information acquired from the respective sensors are transmitted to the own vehicle 1 as travelability determination array information or as object information for arranging the own vehicle 1 in the travelability determination array by communication equipment mounted on the road. The own vehicle 1 may be configured to generate the travelability determination array using the transmitted information or may be configured to perform calculation for limiting deceleration of the own vehicle 1 using the received travelability determination array per se.

When the method is used, a millimeter wave radar can be used in a dark place where the distance measurement by the stereoscopic camera 20 becomes difficult, and the stereoscopic camera 20 is used at an intersection or the like where the number of pedestrians is large so that the distance measurement by a millimeter wave radar becomes difficult. Accordingly, sensing using an appropriate device at an appropriate place can be performed and hence, it is unnecessary for the own vehicle 1 to fully mount sensors for recognizing an external field of the vehicle so as to cope with all situations. As a result, it is possible to acquire an advantageous effect that a vehicle cost can be lowered and mileage is improved due to lowering of the weight of the vehicle.

<Modification 3>

Deceleration limit releasing calculation processing P400 by the deceleration limit releasing calculation unit 400 can be modified as follows.

In processing P430 and processing P440 (FIG. 13), a radius of curvature of an advancing route of the own vehicle 1 which reaches an area indicated by the travelability determination array is acquired and, thereafter, limit deceleration on the left side and the right side is acquired in processing P431, processing P432, processing P441, and processing P442. In this method, a behavior when a uniform brake pressure is applied to left and right wheels of the vehicle 1 is formed into a model. On the other hand, when an electronic control brake force distribution system and a lane departure prevention support system intervenes during an operation of the emergency brake, a turning force in reverse direction is applied to the own vehicle 1. Accordingly, when there is a fixed distance or more from an obstacle ahead of the own vehicle and a speed difference is small, a traveling route of the own vehicle 1 when the emergency brake is operated cannot be expressed by a simple radius of curvature. Accordingly, which amount of deceleration is necessary so as to enable the own vehicle 1 to reach the corresponding position is acquired by an experiment based on the weight distribution of the own vehicle 1, a lateral direction position and a longitudinal direction position of an obstacle with respect to the own vehicle 1, and such a value is set as a parameter. In this case, limit deceleration can be directly calculated from the weight distribution of the own vehicle 1, and the lateral direction position and the longitudinal direction position of the obstacle with respect to the own vehicle 1. Further, in this case, by taking into account an influence where the traveling route of the own vehicle 1 is deflected by the electronic control brake force distribution system and the lane departure prevention support system, the number of scenes where stronger deceleration is applied to the own vehicle 1 is increased.

<Modification 4>

Collision warning determination processing P700 by the collision warning determination unit 700 can be modified as follows.

When limit deceleration induced as a result of deceleration limit releasing calculation is remarkably smaller than the deceleration basic value acquired by the formula (8), this situation indicates that a collision cannot be avoided with high probability. In this case, to avoid the collision, in emergency brake operation determination processing P500, at the stage before an emergency brake operation is performed, a braking manipulation or steering by a driver becomes necessary. Accordingly, a difference between limit deceleration and the deceleration basic value acquired from the formula (8) is acquired, an offset amount is added where a warning operation distance acquired by processing K020 (FIG. 18) becomes remote corresponding to the result, and a driver is requested to perform a brake manipulation in an area remote from an obstacle. Accordingly, it is possible to promote the avoidance of a collision by driving of a driver. On the other hand, it is unnecessary to perform the operation of the brake earlier and hence, it is also possible to prevent the driver from overestimating collision avoidance.

It is needless to say that the present invention is not limited to the above-mentioned embodiment, and various modifications are included in the present invention. For example, the above mentioned embodiment is described in detail so as to facilitate the understanding of the present invention, and is not necessarily limited to the vehicle control device which includes the whole configuration described in the embodiment. Further, some parts of the configuration of the embodiment can be replaced with the configuration of another embodiment, or the configuration of other embodiment can be added to the configuration of another embodiment. Further, with respect to some parts of the configuration of the embodiment, the addition of other configuration, the deletion of the configuration elements and the replacement of the configuration elements with other constitutional elements may also be possible.

Further, some parts or the entirety of the respective configurations, functions, processing units, processing means and the like described above may be realized by hardware by designing using an integrated circuit, for example. Further, the above-mentioned respective configurations, functions and the like may be realized by software which interprets and executes programs with which processor realizes the respective functions. Information on programs, tables, files and the like which realize the respective functions may be stored in a storage device such as a memory, a hard disc a solid state drive (SSD), or a recording medium such as an IC card, an SD card and a DVD.

Further, the control line and information lines which are considered necessary for describing the present invention are indicated, and it is not always the case that all control lines and information lines which are necessary from a viewpoint as a product are indicated. It is safe to say that, in the actual device and system, substantially all configuration elements are mutually connected to each other.

LIST OF REFERENCE SIGNS

1: vehicle (own vehicle)
2: stopped vehicle
3: neighboring vehicles (other vehicles)
4: oncoming vehicle
5: pedestrian
6: guard rail
7: utility pole
20: stereoscopic camera (vehicle external field recognition sensor)
25: rear stereoscopic camera (vehicle external field recognition sensor)
27: side stereoscopic camera (vehicle external field recognition sensor)
30: brake control unit
40: power train control unit
41: engine
42: transmission
60: brake
70: meter control unit
71: display device
72: buzzer
100: vehicle control device
110: communication data acquisition unit
120: communication date output unit
200: deflection estimation unit
300: travelability determination unit
400: deceleration limit releasing calculation unit
500: emergency brake operation determination unit
600: emergency brake deceleration calculation unit 700: collision warning unit
800: braking control unit

The invention claimed is:

1. A vehicle control device configured to perform a deceleration control of a vehicle for reducing or avoiding collision damage between the vehicle and an obstacle ahead of the vehicle, the vehicle control device comprising:
   a travelability determination unit configured to determine whether or not the vehicle is travelable in an area disposed ahead of the vehicle on left and right sides of the vehicle;
   a deflection estimation unit configured to estimate a deflection of the vehicle due to generation of a brake force applied to the vehicle; and
   a braking control unit configured to calculate a deceleration and a deceleration start time based on a distance between the vehicle and the obstacle ahead of the vehicle and a relative speed of the vehicle to the obstacle, and configured to change at least one of the deceleration and the deceleration start time based on a travelability determination result acquired from the travelability determination unit and a deflection estimation result acquired from the deflection estimation unit, the braking control unit including:
      a deceleration limit releasing calculation unit configured to calculate limit deceleration for suppressing an occurrence of the deflection of the vehicle which leads to an entry of the vehicle into a non-travelable area which is not determined to be travelable by the travelability determination result acquired from the travelability determination unit, based on the travelability determination result acquired from the travelability determination unit and the deflection estimation result acquired from the deflection estimation unit; and
      an emergency brake deceleration calculation unit configured to calculate a deceleration basic value based on the distance between the vehicle and the obstacle ahead of the vehicle and the relative speed, and to set either one of the deceleration basic value and the limit deceleration which takes a smaller value as the deceleration used in the deceleration control of the vehicle.

2. The vehicle control device according to claim 1, wherein
   the braking control unit is configured to suppress the occurrence of the deflection of the vehicle by which the vehicle enters a non-travelable area which is not determined to be travelable based on the travelability determination result acquired by the travelability determination unit, by changing at least one of the deceleration or the deceleration start time.

3. The vehicle control device according to claim 1, wherein
   the deflection estimation unit is configured to estimate the deflection of the vehicle due to generation of the brake force applied to the vehicle by estimating a loaded state of the vehicle.

4. The vehicle control device according to claim 3, wherein
   the deflection estimation unit is configured to estimate the loaded state of the vehicle by estimating which position a load weight is offset to either left or right position of the vehicle.

5. The vehicle control device according to claim 4, wherein
   the deflection estimation unit is configured to estimate which position the load weight is offset out of left and right positions of the vehicle, by comparing a yaw rate sensor value at a time of acceleration or the deceleration start time and a yaw rate estimated from a steering angle, by determining tilt of the vehicle with respect to a road surface from an imaged image using a camera, or by determining weights applied to weight sensors disposed on the left and the right sides of the vehicle.

6. The vehicle control device according to claim 1, wherein
   the travelability determination unit is configured to monitor a traveling environment of the vehicle using a vehicle external field recognition sensor, and is configured to determine that the area disposed ahead of the vehicle on the left and the right sides is non-travelable for the vehicle in a case where a stereoscopic object exists in the area disposed ahead of the vehicle on the left and right sides or when a road surface on which the vehicle is travelable does not exist in the area disposed ahead of the vehicle on the left and right sides.

7. The vehicle control device according to claim 6, wherein
   the travelability determination unit is configured, in determining whether or not the stereoscopic object exists in the area disposed ahead of the vehicle on the left and the right sides, to determine whether or not the stereoscopic object exists in the area disposed ahead of the vehicle on the left and right sides at timing that the vehicle reaches the area disposed ahead of the vehicle on the left and right sides by taking into account a moving speed and a moving direction of the stereoscopic object.

8. The vehicle control device according to claim 1, wherein
   the area disposed ahead of the vehicle on the left and right sides is formed of the area disposed ahead of the vehicle on the right side and the area disposed ahead of the vehicle on the left side which are detected by a vehicle external field recognition sensor mounted on the vehicle and monitoring a front side of the vehicle, the area disposed ahead of the vehicle on the right side is an area disposed in a frontward direction from a front end of the vehicle and in a right direction from a right end of the vehicle, and the area disposed ahead of the vehicle on the left side is an area disposed in a front direction from the front end of the vehicle and in a left direction from a left end of the vehicle.

9. The vehicle control device according to claim 1, wherein
   the deceleration limit releasing calculation unit is configured to set, out of left and right limit decelerations calculated with respect to the area disposed ahead of the vehicle on the left and the right sides of the vehicle, a smaller deceleration as the limit deceleration with respect to the vehicle.

10. The vehicle control device according to claim 1, wherein
    the deceleration limit releasing calculation unit is configured to acquire a radius of curvature when the vehicle enters a non-travelable area which is not determined to be travelable by the travelability determination result acquired by the travelability determination unit, is configured to calculate the limit deceleration based on a yaw rate calculated based on the radius of curvature and left and right weight distribution of the vehicle.

11. The vehicle control device according to claim 10, wherein
the deceleration limit releasing calculation unit is configured to increase the limit deceleration in accordance with the increase of an absolute value of the yaw rate or in accordance with a decrease of a deflection amount of left and right weight distribution of the vehicle.

* * * * *